United States Patent [19]
Berberich

[11] Patent Number: 5,659,443
[45] Date of Patent: Aug. 19, 1997

[54] SPLIT BAND RETAINER FOR RADIALLY CLAMPING A DISK TO A HUB IN A DISK DRIVE

[75] Inventor: James W. Berberich, San Jose, Calif.

[73] Assignee: International Business Machines Corporation, Armonk, N.Y.

[21] Appl. No.: 566,360

[22] Filed: Dec. 1, 1995

[51] Int. Cl.$^6$ .................................. G11B 17/038
[52] U.S. Cl. .................. 360/98.06; 360/98.06; 360/98.08
[58] Field of Search ............... 360/98.02, 98.06, 360/98.08, 99.05, 99.12, 135

[56] References Cited

U.S. PATENT DOCUMENTS

| | | | |
|---|---|---|---|
| 4,754,351 | 6/1988 | Wright | 360/98.08 X |
| 4,764,828 | 8/1988 | Golbach | 360/98.08 |
| 5,136,450 | 8/1992 | Moir | 360/135 |
| 5,243,481 | 9/1993 | Dunckley et al. | 360/99.08 |
| 5,267,106 | 11/1993 | Brue et al. | 360/98.08 |
| 5,270,999 | 12/1993 | Chessman et al. | 369/290 |
| 5,315,463 | 5/1994 | Dew et al. | 360/98.08 |
| 5,315,465 | 5/1994 | Blanks | 360/106 |
| 5,550,690 | 8/1996 | Boutaghou et al. | 360/99.12 |

FOREIGN PATENT DOCUMENTS

| | | |
|---|---|---|
| 0522717A2 | 1/1993 | European Pat. Off. . |
| 3816975 | 11/1989 | Germany . |
| 62-8358 | 1/1987 | Japan . |
| 4-195977A | 7/1992 | Japan . |
| 4-268210 | 9/1992 | Japan . |
| WO93/26006 | 12/1993 | WIPO . |

OTHER PUBLICATIONS

IBM/TDB, vol.26, No.12, Self–Centering Disk Clamp, Bosier et al 360/99.12 May 1984.
IBM/TDB vol.21, P.802–3, Disk Pack Compliance Clamp, Besha et al 360/98.08 Jul. 1978.
D. W. Glaess et al., "Low Profile Clamping Apparatus for Rigid Magnetic Media", *IBM Technical Disclosure Bulletin*, vol. 36, No. 11, Nov. 1993.

Y. Harada et al., "HDD Disk with Slanted Clamp Surface", *IBM Technical Disclosure Bulletin*, vol. 37, No. 06A, Jun. 1994.

*Primary Examiner*—John H. Wolff
*Attorney, Agent, or Firm*—Baker, Maxham Jester & Meador

[57] ABSTRACT

A retainer includes a resilient split band with a transition region and a loading region between its top and bottom edges. The loading region of the split band is provided with a plurality of loading domes which extend inwardly and a plurality of tabs which are located in the transition region of the split band adjacent its top edge. Upon assembly, the inner annular edge of the disk is located in the transition region of the split band with the top surface of the disk engaging the bottoms of the tabs. Downward movement of the split band on a spindle hub causes the loading domes to engage a cylindrical hub and cone the split band with its bottom edge located inwardly from its top edge. Pushing downwardly on the tabs causes the disk and the retainer to be forced downwardly on the spindle hub until the bottom edge of the split band engages a hub flange within a recess adjacent the hub. Downward pressure is then applied to the top surface of the disk causing the inner annular edge of the disk to be moved from the transition to the loading region of the split band. This causes the loading dome to be compressed against the cylindrical surface of the hub to apply a radial loading pressure between the inner annular edge of the disk and the outer cylindrical surface of the hub. This radial loading pressure retains the disk to the hub.

47 Claims, 17 Drawing Sheets

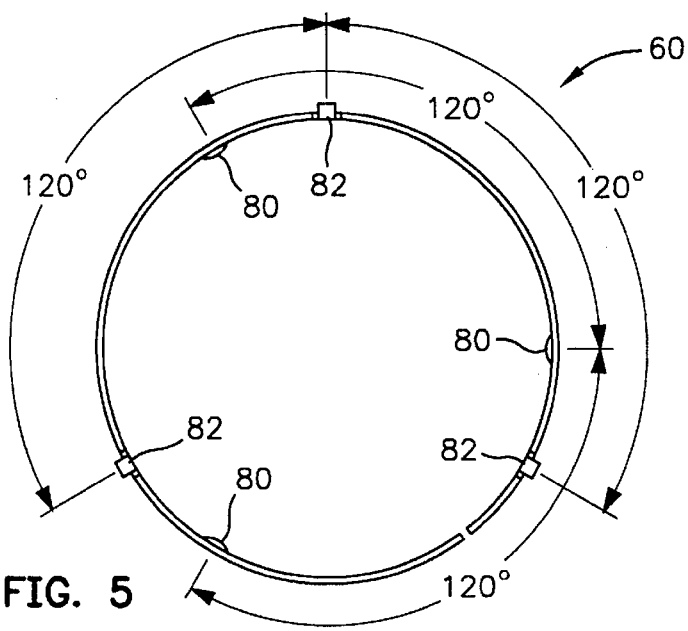
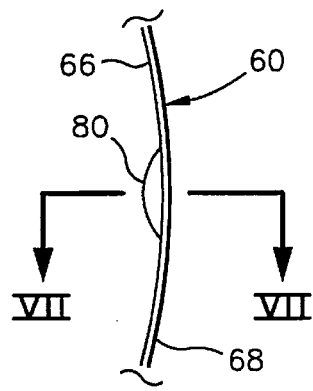
FIG. 5
FIG. 6
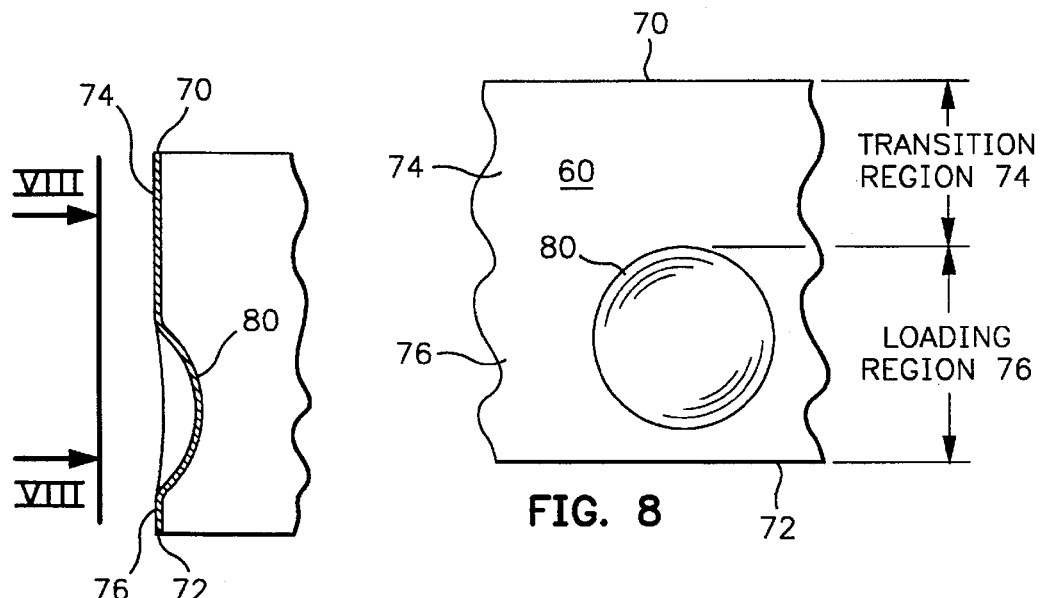
FIG. 7
FIG. 8
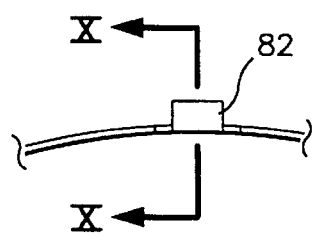
FIG. 9
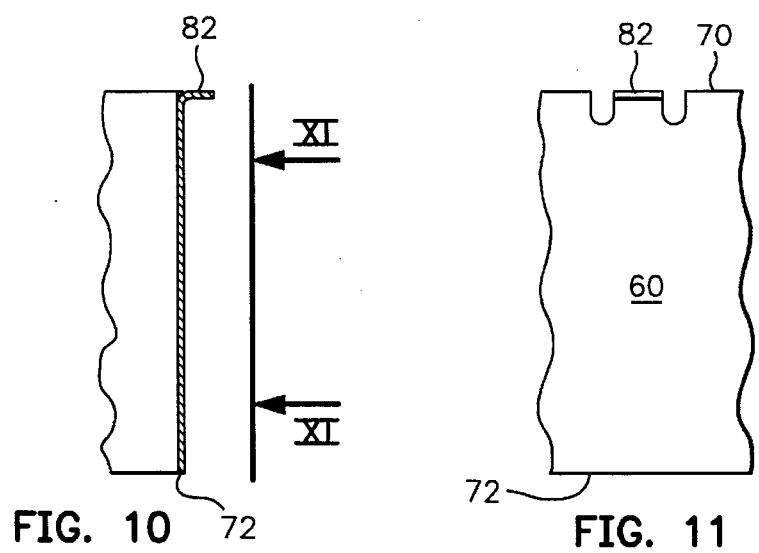
FIG. 10
FIG. 11

SPLIT BAND RETAINER FOR RADIALLY CLAMPING A DISK TO A HUB IN A DISK DRIVE

BACKGROUND OF THE INVENTION

1. Field of the Invention

The present invention relates to a split band retainer for radially clamping a disk to a spindle hub of a disk drive and more particularly to a split band retainer which is fashioned to permit easy manual or automated assembly of one or more disks to a hub.

2. Description of the Related Art

In a magnetic disk drive one or more disks may be mounted on a spindle hub of a disk drive, the hub being rotated by a motor. In addition, one or more magnetic heads may be mounted on a slider, the slider being mounted on a suspension. The suspension is connected to an actuator which moves each magnetic head to a location adjacent a respective surface of a disk for reading and writing information on the disk. The information is contained in narrow circular tracks that are typically no more than 3 μm wide, and it is important that the active portion of a magnetic head remain within such a narrow track during read and write operations. Lateral movement of the disk with respect to the hub may displace a magnetic head with respect to a track. Such lateral movement is referred to as "radial slip" and the resulting off track performance is referred to as "misregistration". As tracks are narrowed in width to increase disk drive storage density, performance interruptions stemming from misregistration increase. Radial slip and misregistration can occur when shock loading of a disk drive occurs, such as when a laptop computer is dropped.

A disk has a central aperture bounded by an inner annular edge. When the disk is mounted in a drive on a hub, the inner annular edge is spaced from a cylindrical surface of the hub, forming an annular gap therebetween. If the inner annular edge of the disk directly engages the cylindrical hub, temperature changes can cause different expansions and contractions of the disk relative to the hub. This can cause the disk to warp upon compression or disengage the hub upon expansion. In both instances misregistration can occur.

Most disk drives include a retainer disposed in the annular gap between the inner annular edge of the disk and the outer surface of the hub to center the disk on the hub. The retainer also absorbs shock and differential expansion between the disk and the hub.

A primary purpose of the retainer is to permit easy assembly of the disk on the hub. A prior art retainer, which permits easy assembly, is described in Patent Cooperation Treaty (PCT) Application No. WO 93/26006", published 23 Dec. 1993. This retainer employs a corrugated split band in the annular gap for mounting a plurality of disks on a hub. During assembly, the corrugated split band is biased inwardly toward the hub, disks are disposed about the corrugated band, and then the corrugated band is released so that the corrugations spring mount the disks to the hub. While this retainer permits easy assembly it would be desirable to more rigidly mount the disks to the hub and to reduce weight by providing discrete retainers instead of a single cylindrical retainer which extends along the hub between the disks.

A retainer should also provide a predictable predetermined radial clamping pressure between disk and hub. This pressure should be distributed about the inner annular edge of the disk.

There is a strong felt need for a disk to hub retainer which permits easy manual or automated assembly of the disk on the hub, which is discrete with respect to each disk and which applies predictable radial clamping pressure which is distributed about the inner annular edge of the disk.

SUMMARY OF THE INVENTION

The present invention provides a retainer comprising a resilient split band which has a height bounded by top and bottom edges. The height comprises a top annular transition region, which is partially bounded by the top edge, and an adjacent bottom annular loading region, which is bounded by the bottom edge. The loading region has inwardly extending loading devices for engaging the cylindrical surface of a hub in a disk drive and the transition region has outwardly extending tabs for retaining a disk when the disk and retainer are loaded on the hub.

Preferably, the hub may include a hub flange with an annular recess adjacent the cylindrical surface of the hub. During disk drive assembly a disk is positioned such that its inner annular edge is disposed in the transition region and the tabs are pushed downwardly causing the loading devices to engage a top cylindrical edge of the hub. This causes the retainer to assume the shape of a cone ("cones") with its bottom edge located outwardly with respect to its top edge. Continued downward pushing on the tabs engages the bottom edge of the retainer with the hub flange within its annular recess. The disk is then pushed downwardly to the loading region of the split band retainer compressing the loading devices against the cylindrical surface of the hub and causing the split band retainer to decone. The uniquely fashioned split band retainer permits automatic mounting of one or more disks on a hub.

To mount a second disk on the hub a second split band retainer is employed in substantially the manner as described hereinabove. A disk spacer is employed between the disks which has top and bottom annular recesses adjacent the cylindrical surface of the hub. The disk spacer can be employed for pushing a first mounted disk from the transition region to the loading region of the first split band retainer. The top and bottom annular recesses of the spacer provide spaces for the bottom edge of the second split band retainer and the tabs of the first split band retainer respectively. A cap may be employed for pushing the second disk from a transition region to a loading region of the second split retainer band and may have a recess for providing space for the tabs of the second split band retainer.

The split band retainer permits automated assembly of a disk on a hub by employing a tool which comprises an annular chuck slidably mounted on a cylindrical mandrel. The split band retainer may be biased about the mandrel with its loading region extending therebelow. The inner annular edge of a disk is retained in the transition region of the split band retainer in engagement with the tabs by a vacuum force at the bottom of the chuck. The entire tool is moved to engage the loading region of the split band retainer with the top of the hub which causes the split band retainer to cone. The chuck then moves downwardly against the tabs until the bottom edge of the retainer engages the hub flange within its recess. The disk spacer or an equivalent device is then employed to push the disk from the transition region to the loading region of the split band retainer.

In a preferred embodiment the loading devices are inwardly extending loading domes which are compressed when the disk transitions from the transition region of the loading region. It is also preferred that three such loading domes be employed at 120° from one another. The loading forces provided by the loading domes is predictable. While the loading domes exert concentrated forces against the cylindrical surface of the hub the load is substantially uniformly distributed about the inner annular edge of the disk.

An object of the present invention is to provide a retainer which permits easy manual or automated assembly of a disk on a spindle hub.

Another object is to provide a retainer for loading a disk on a hub with concentrated loading on a cylindrical surface of the hub and distributed loading about an inner annular edge of the disk.

A further object is to provide a retainer that cones upon engagement with the hub and which decones and loads the disk on the hub when the disk is pushed downwardly on the retainer.

Still another object is to provide a more efficient and low cost manual or automated assembly of a disk on a spindle hub.

Other objects and attendant advantages of the invention will be appreciated by reference to the following description and accompanying drawings.

DESCRIPTION OF THE DRAWINGS

FIG. 5 is a top plan view of the retainer.

FIG. 6 is an enlargement of a portion of FIG. 5 to show one of the loading domes.

FIG. 7 is a view taken along plane VII—VII of FIG. 6.

FIG. 8 is a view taken along plane VIII—VIII of FIG. 7.

FIG. 9 is an enlargement of FIG. 5 showing one of the tabs.

FIG. 10 is a view taken along plane X—X of FIG. 9.

FIG. 11 is a view taken along plane XI—XI of FIG. 10.

DESCRIPTION OF THE PREFERRED EMBODIMENTS

Figure 1:
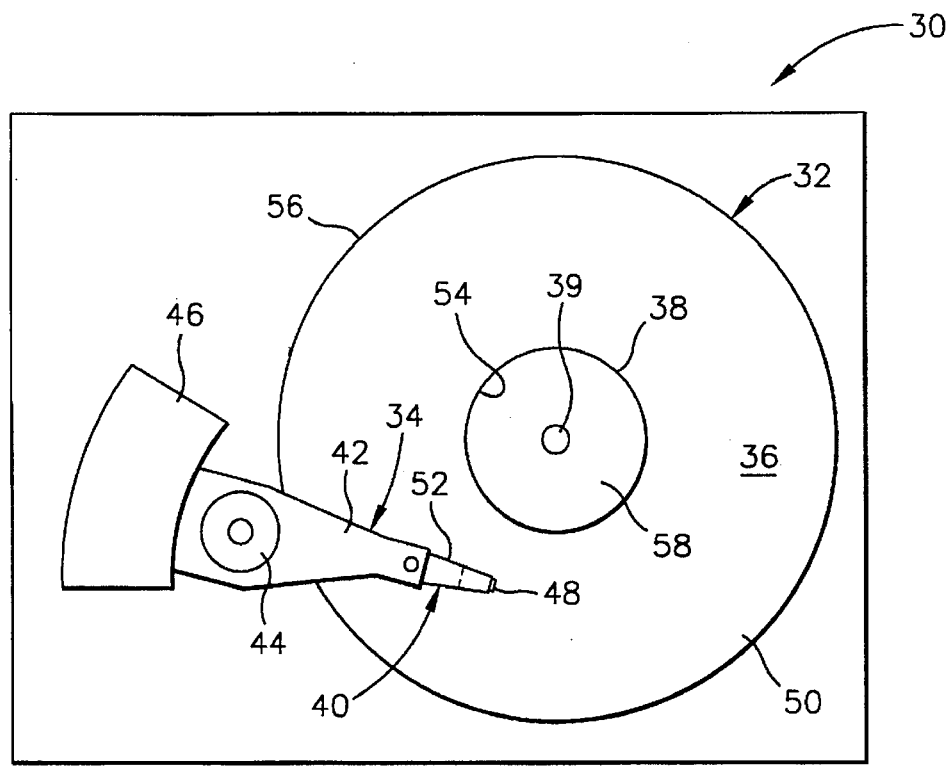
FIG. 1 is a schematic plan view of a magnetic disk drive which employs the present invention.
Figure 2:
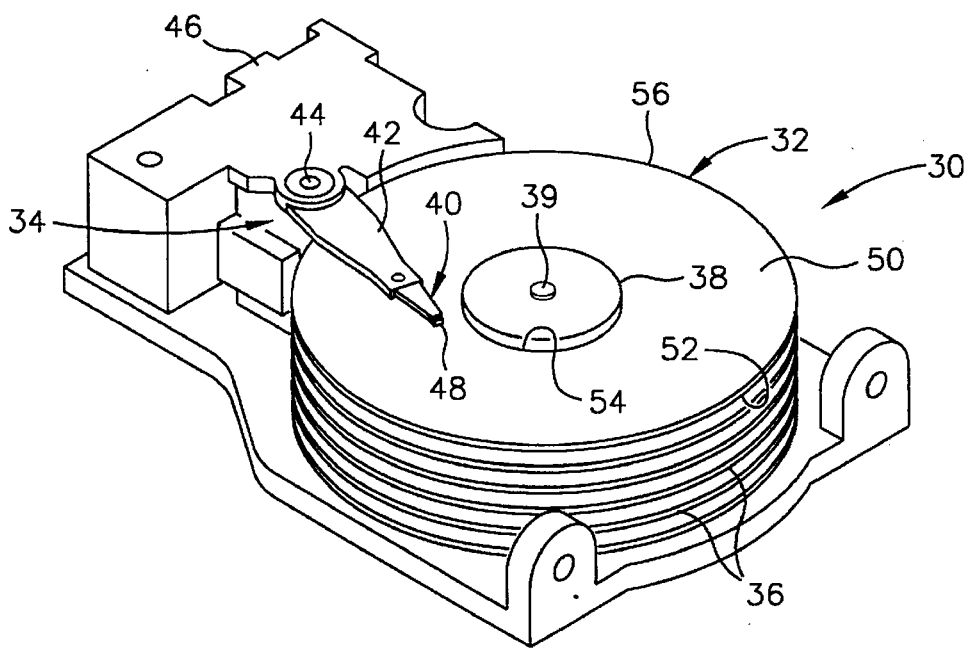
FIG. 2 is a schematic isometric illustration of the magnetic disk drive.

Referring now to the drawings wherein like reference numerals designate like or similar parts throughout the several views, there is illustrated in FIGS. 1 and 2 a magnetic disk drive 30 which includes a disk stack assembly 32 and a head stack assembly 34. The disk stack assembly 32 includes a plurality of double-sided magnetic disks 36 which are supported for rotation by a spindle hub 38, the spindle hub 38 being mounted on a spindle 39 and rotated by a motor (not shown). The head stack assembly 34 includes a plurality of suspensions 40 which are connected to actuator arms 42, the actuator arms 42 being mounted for rotation on an actuator spindle 44 and being rotated by an actuator voice coil motor 46. Except for top and bottom suspensions, the suspensions are mounted in pairs to the actuator arms.

Each suspension 40 carries a slider 48 upon which there is mounted a magnetic head (not shown) for reading and writing information on circular tracks of a respective disk 36. Processing circuitry (not shown) is connected to the motor for rotating the disks 36, is connected to the actuator voice coil 46 for positioning the magnetic heads at selected circular tracks on the magnetic disk 36 and is connected to the magnetic heads for processing read and write signals. Each suspension 40 biases (preloads) the respective magnetic head toward the surface of the disk. When a magnetic disk 36 is rotated adjacent the slider 48, air is generated by the moving disk to create an air bearing which counterbalances the preloading to cause the slider to fly a short distance from the surface of the disk, in the order of 0.075 μm (ABS to disk surface).

The disk stack assembly 32 is assembled by mounting the disks 36 on the spindle hub 38. As shown in FIG. 2, the disks 36 have top and bottom flat surfaces 50 and 52 which are bounded by inner and outer annular edges 54 and 56. The inner annular edge of the disk defines an aperture 58, the center of which should remain centered with the center of the spindle hub 38. The centering of the disk with respect to the spindle hub 38 is important so that the magnetic head on the slider 48 reads information from the same circular track to which information was written. If the disk is moved off center with respect to the spindle hub 38, this is referred to as "radial slip" which causes off-track performance of the magnetic head which is called "track misregistration". With the trend to make tracks narrower, the allowable tolerance for radial slip becomes smaller. Since the typical substrate for the magnetic disk 36 is glass and the material for the spindle hub is steel, the disk and hub have different coefficients of expansion which can result in radial slip if the disk is directly mounted to the spindle hub. Upon an increase in temperature the hub will cause warpage of the disk and upon a decrease in temperature slop will occur between the hub and the disk. Both of these conditions can cause an intolerable radial slip and track misregistration. Consequently, a flexible mounting such as a retainer is required, between the disk and the hub to minimize radial slip due to temperature changes. Such a retainer must also be capable of preventing radial slip upon the occurrence of shock loading, such as by jostling or dropping of the disk drive. In order to prevent radial slip, the retainer must provide a radial clamping pressure between the inner annular edge of the disk and the outer cylindrical surface of the hub 38. It is desirable that the radial clamping pressure be distributed about the inner annular edge 54 of the disk since concentrated forces can warp the disk. Further, it is important that the retainer be fashioned so that it will permit easy assembly of the disk on the spindle hub by manual or automated steps. The following description explains the assembly of a pair of disks on a spindle hub, which teaching may be employed for assembling any number of disks on the spindle hub as shown in FIG. 2.

Figure 3:
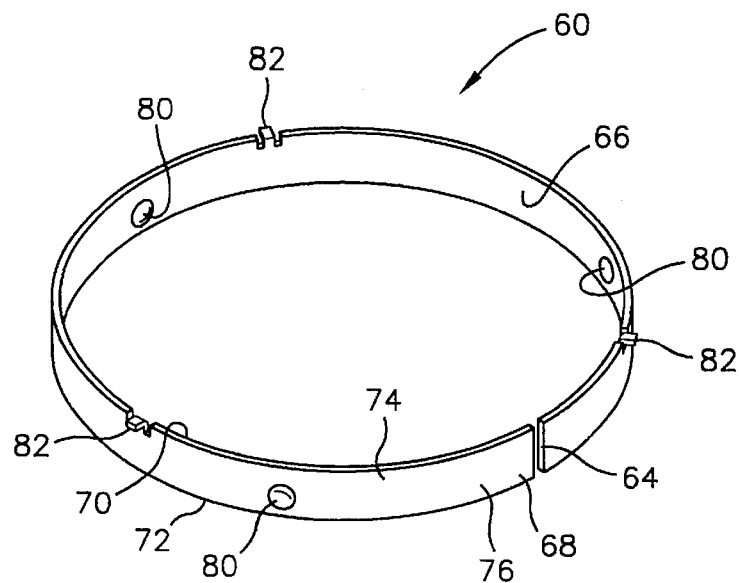
FIG. 3 is an isometric illustration of the present disk to hub retainer.

The present retainer, as shown in FIG. 3, is a split band 60 which is split at 64. The split band 60 may be constructed of thin stainless steel so that when it is expanded it applies an inwardly biasing force for purposes to be explained hereinafter. The split band 60 has inner and outer substantially arcuate surfaces 66 and 68. The inner and outer annular surfaces 66 and 68 are bounded by top and bottom substantially arcuate edges 70 and 72. The inner and outer annular surfaces 66 and 68 are divided along the width of the split band into transition and loading regions 74 and 76. The transition region 74 is partially bounded by the top edge 70 and the loading region 76 is partially bounded by the bottom edge 72. The transition region 74 extends from the top edge 70 to the top edge of the dome 80 and the loading region 76 extends from the top edge of the dome 80 to the bottom edge 72 as shown in FIG. 8. Each of the transition region 74 and the loading region 76 is capable of accommodating the inner annular surface 54 of a respective disk which will be described hereinafter. Consequently, each region 74 and 76 has a width which is at least equal to the thickness of the disk 36.

The split band 60 has a plurality of loading domes 80, the centers of which are located within the loading region 76. The loading domes 80 extend outwardly from the loading region 76 of the outer surface 68 of the split band. Each loading dome may be shaped in a portion of a sphere and may be constructed by stamping the split band from its inner surface 66. In the preferred embodiment three loading domes 80 are employed which are annularly spaced substantially 120° from one another. The aforementioned radial clamping pressure between the disk and the spindle hub is implemented by compression of the loading domes 80. The type and thickness of the material, the height of the domes 80 projecting from the outer surface 68, and the number of domes will determine the degree of clamping pressure. Upon establishment of these parameters the loading domes provide predictable and reliable radial clamping pressure. It is important to note that the loading domes do not exert concentrated forces on the inner annular edge 54 of the disk. While the loading domes exert concentrated forces on the cylindrical surface of the spindle hub the outer surface 76 of the split band exerts a distributed load on the inner annular edge 54 of the disk as will be described hereinafter.

Figure 4:
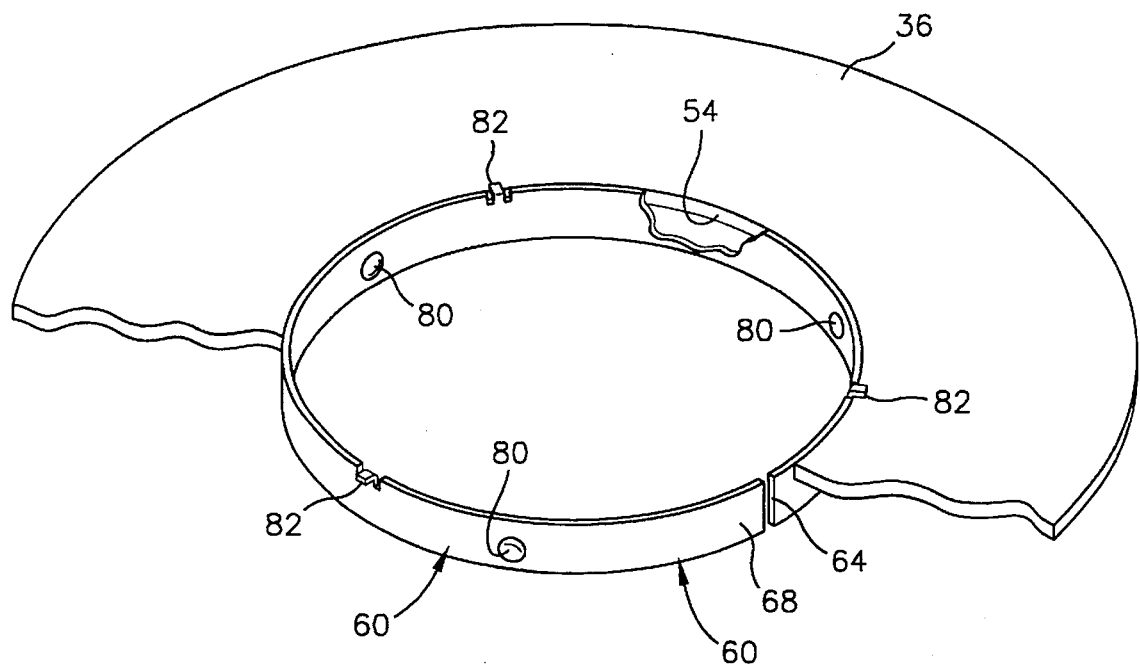
FIG. 4 is an isometric illustration of a disk mounted in the loading region of the retainer, the disk being partially cut away to show details of the retainer.

The transition region 74 of the split band 60 is provided with a plurality of tabs 82 which extend outwardly from the outer surface 68 adjacent the top edge 70. In a preferred embodiment, three tabs are employed which are spaced between the loading domes 80. In FIG. 4, the disk is shown located in the transition region of the split band 60 with the top surface of the disk 36 in engagement with the bottom of the tabs 82. When the disk is in the transition region, the split band 60 has not been squeezed inwardly and there may be a slight tolerance between the outer surface 68 of the band and the inner edge 54 of the disk. As described hereinafter, the split band 60 and the disk will be mounted on the spindle hub by moving the disk downwardly from the transition region to the loading region causing the loading domes 80 to be compressed tightly against the cylindrical surface of the hub 38 to load the disk thereon. FIGS. 5–11 show details of the split band 60.

Figure 12:
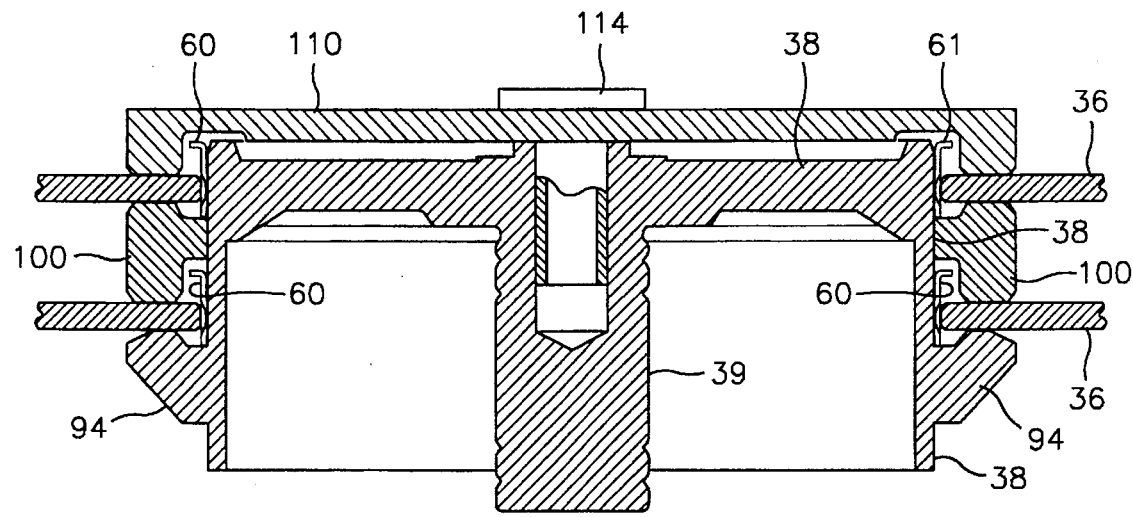
FIG. 12 is an elevational sectional view of a pair of disks mounted to a spindle hub by a pair of the present retainers.
Figure 13:
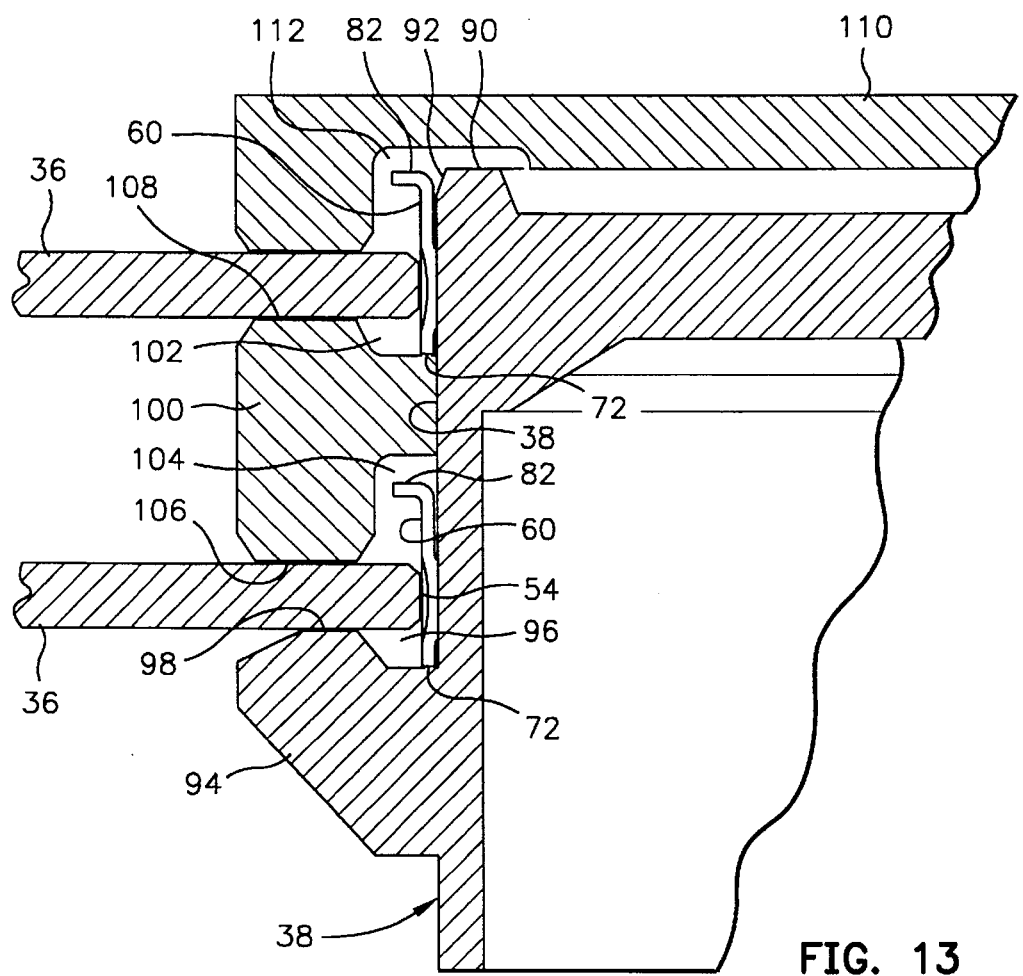
FIG. 13 is an enlargement of a portion of FIG. 12.
Figure 14:
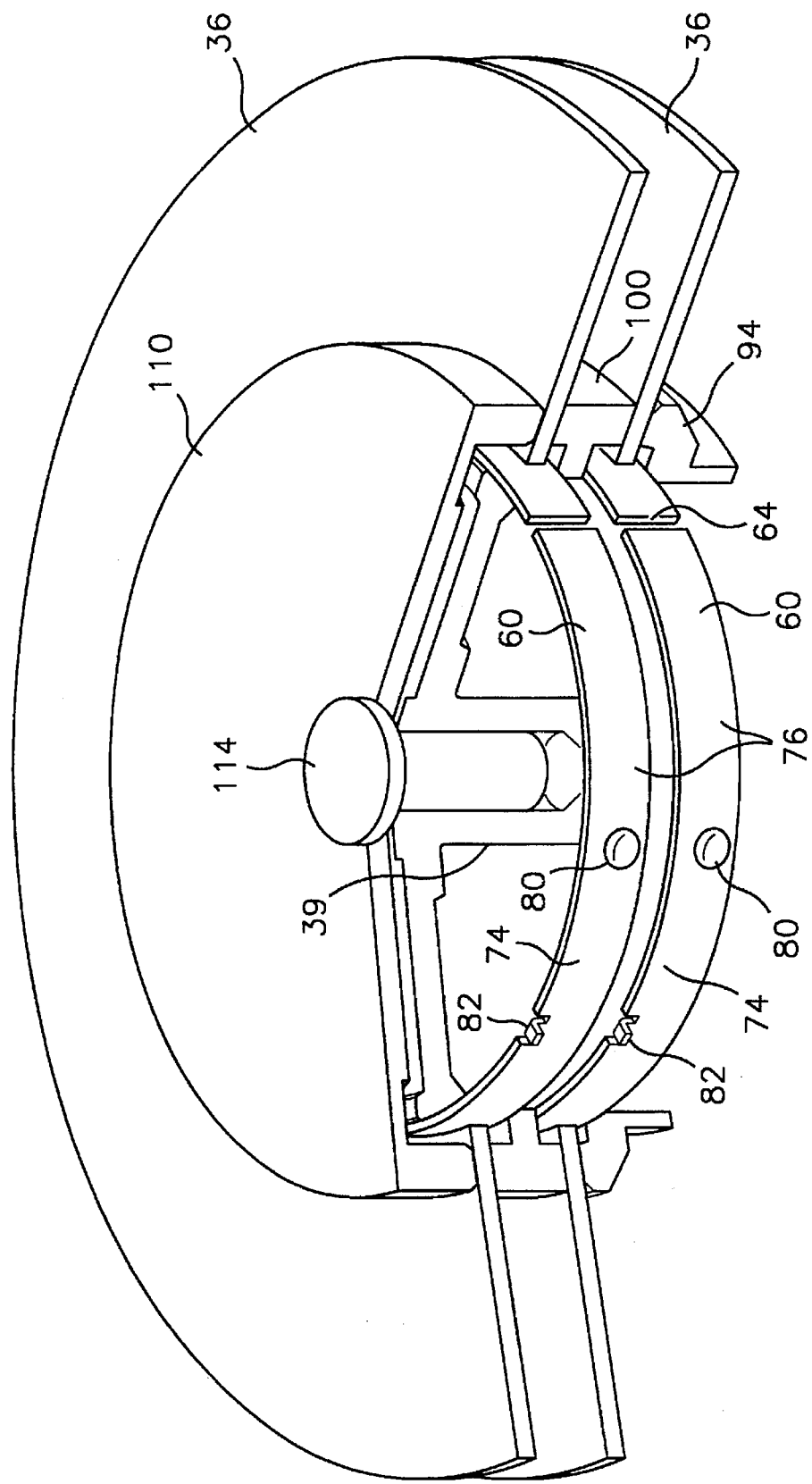
FIG. 14 is an isometric illustration of the pair of disks mounted on the spindle hub by a pair of the present retainers with portions of the disk, disk spacer, spindle hub and hub flange being broken away to show various details of the retainers.
Figure 15:
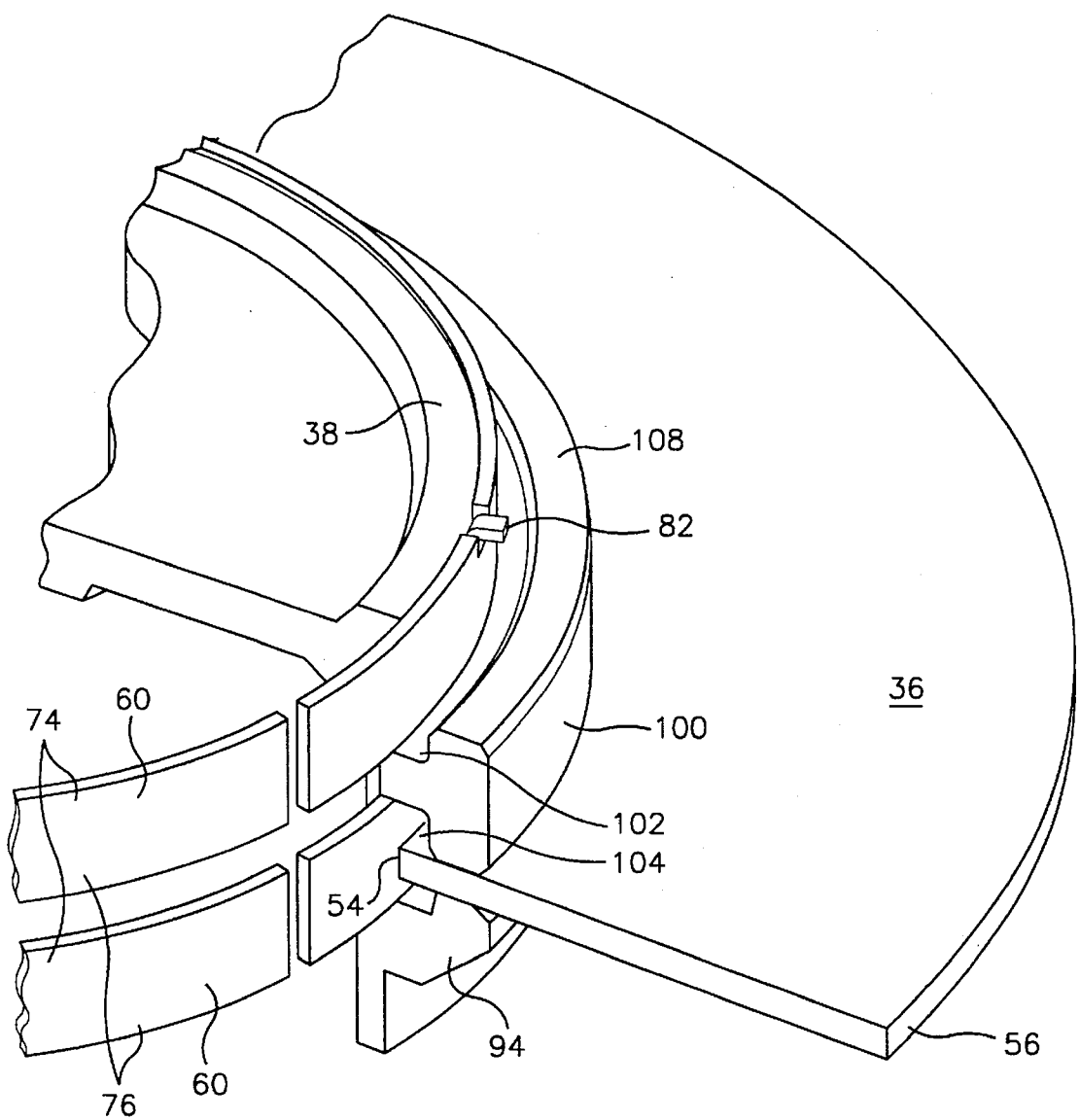
FIG. 15 is an enlargement of a portion of FIG. 14.

FIGS. 12 and 13 show a pair of disks 36 mounted on the spindle hub 38 by a pair of split bands 60. As stated hereinabove, the spindle hub has an outer cylindrical surface. The spindle hub has a top flat end 90 which has an annular chamfer 92. Spaced downwardly from the top end 90 is an annular hub flange 94 which is provided with an annular recess 96 adjacent the cylindrical surface of the hub and a top annular flat surface 98. Between the top and bottom disks 36 is a disk spacer 100 which has top and bottom annular recesses 102 and 104 which are adjacent the cylindrical surface of the spindle hub 38. The bottom disk is loaded on the spindle hub by the bottom split band 60 with the bottom flat surface of the disk in direct engagement with the top surface 98 of the hub flange. During assembly the bottom disk 36 is moved from the transition region 74 to the loading region 76 of the split band 60 (see FIG. 8) causing the loading domes 80 to be compressed against the outer cylindrical surface of the spindle hub 38 to provide a radial clamping pressure between the disk 36 and the hub 38. After assembly of the disk 36 on the spindle hub, the bottom edge 72 of the split band engages the hub 94 within its recess 96 and the top of the disk is spaced from the bottom of the tab 82 of the split band as shown in FIG. 13. The radial load is distributed about the inner annular edge 54 of the disk while the load is concentrated on the cylindrical surface of the spindle hub 38. A bottom flat surface 106 of the spacer 100 directly engages the top surface of the bottom disk 36 with its annular recess 104 providing space for the tab 82 and transition region 74 (see FIG. 8) of the split band 60. The top disk 36 is loaded onto the spindle hub in substantially the same manner as described for the bottom disk. The bottom edge 72 of the top split band engages the disk spacer 100 within its recess 102 and the bottom flat surface of the top disk 36 directly engages a top surface 108 of the disk spacer. A cap 110 is placed on top of the spindle hub and has an annular recess 112 for accommodating the tabs 82 and transition region 74 (see FIG. 8) of the top split band 60. The cap 110 may be retained to the spindle hub by a bolt 114 which is threaded into the spindle 38. An isometric illustration of the mounting of the disks to the spindle hub is shown in FIGS. 14 and 15. The transition and loading regions 74 and 76 and the tabs 82 (see FIGS. 3 and 8) of the retainers play an important role in efficient manual or automated assembly of the disks on the spindle hub which will be described next.

Figure 16:
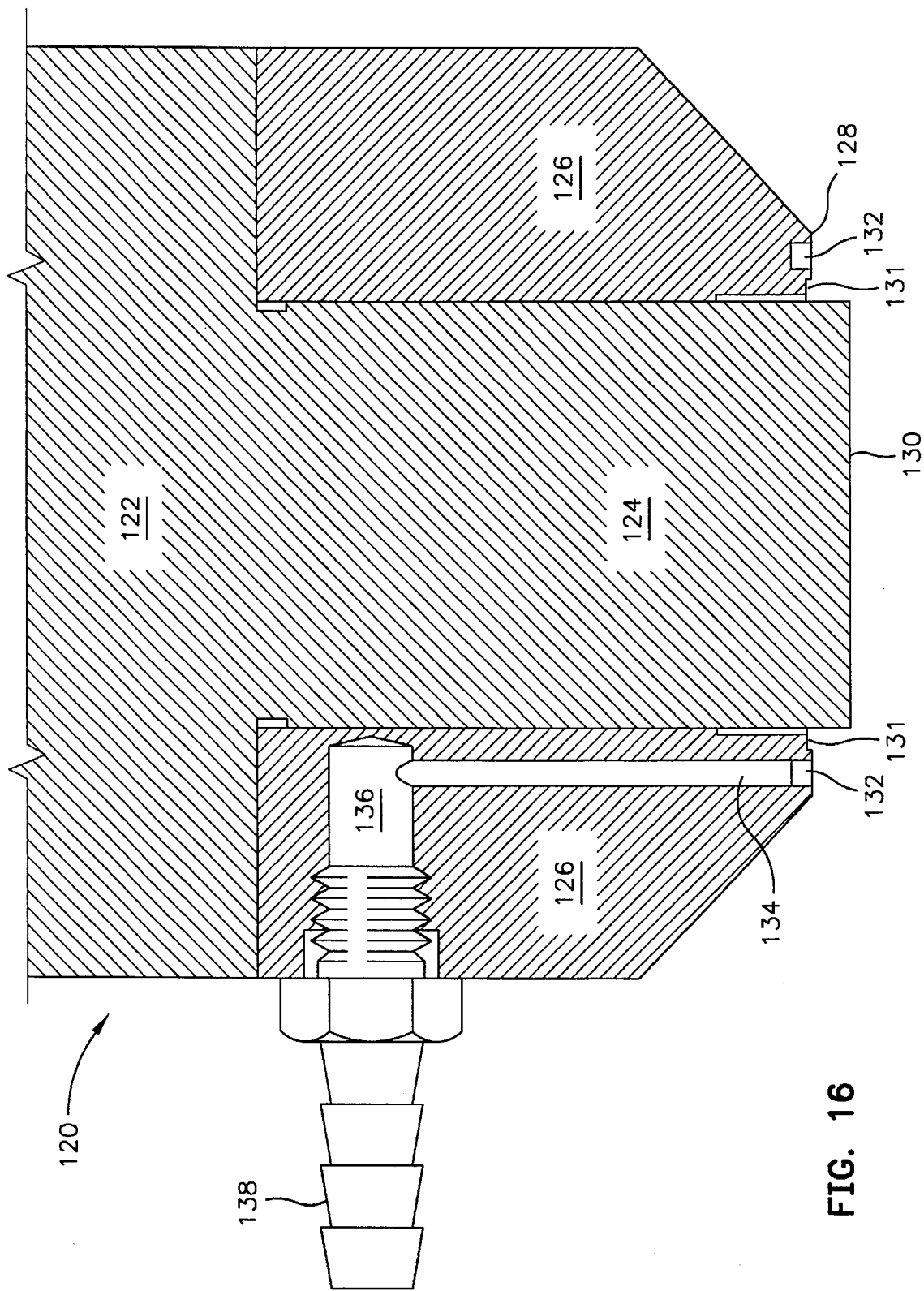
FIG. 16 is an elevational cross-sectional view of an exemplary tool for mounting the disk on the spindle hub with the present retainer, the tool comprising a mandrel and a chuck.

FIG. 16 illustrates an exemplary tool 120 which may be employed for automated assembly of the disk on the spindle hub with the aforementioned split band 60. The tool 120 includes a mandrel 122 which has a necked down cylindrical portion 124 and an annular chuck 126. The necked down cylindrical portion 124 has substantially the same diameter as the spindle hub 38. The chuck 126 is slidably mounted on the mandrel 122 with an annular flat bottom end 128 of the chuck being spaced upwardly from a flat circular bottom end 130 of the mandrel when the chuck is in its uppermost position.

Figure 17:
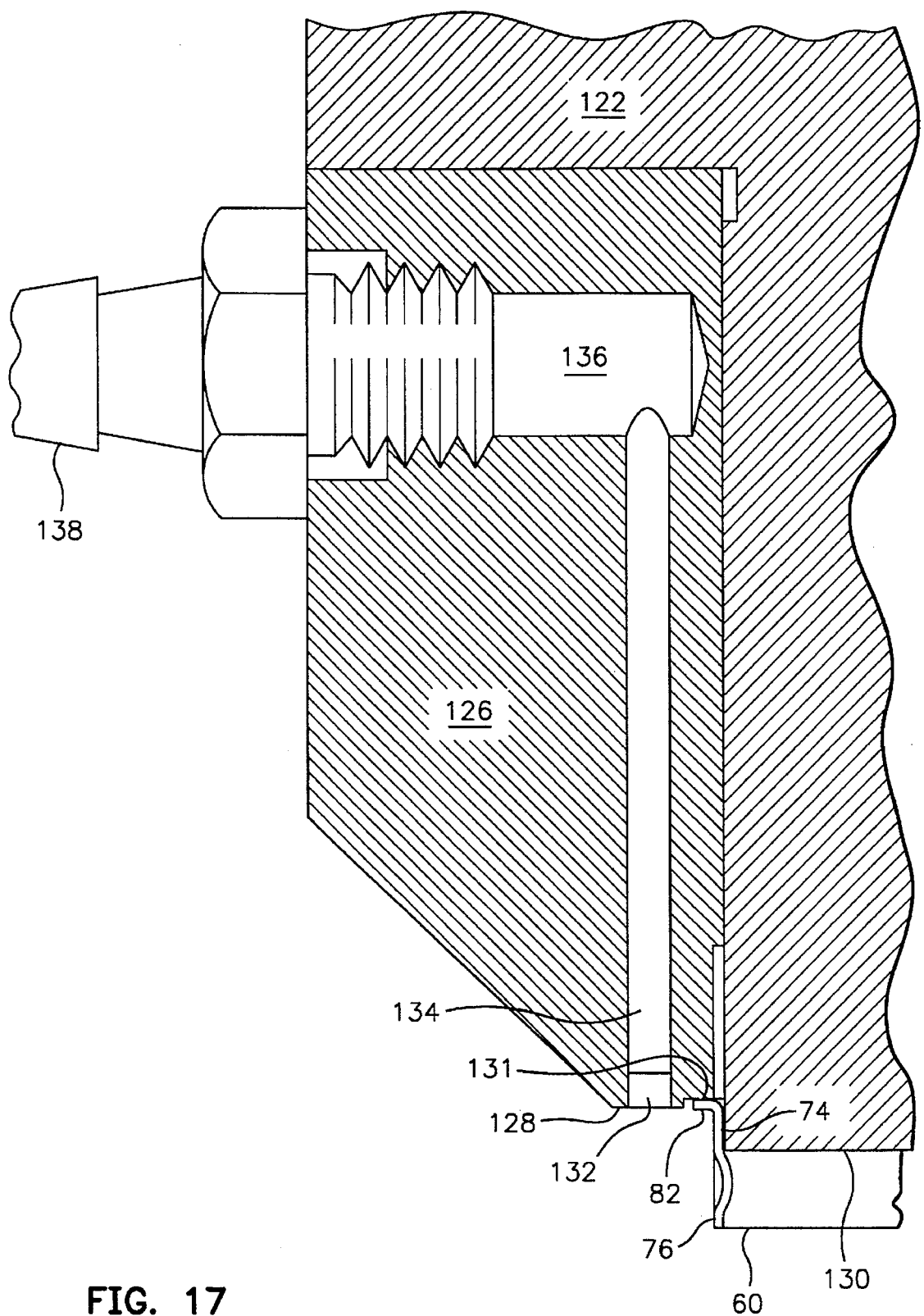
FIG. 17 is an enlarged left portion of FIG. 16 with the present retainer mounted on a bottom portion of the mandrel.
Figure 18:
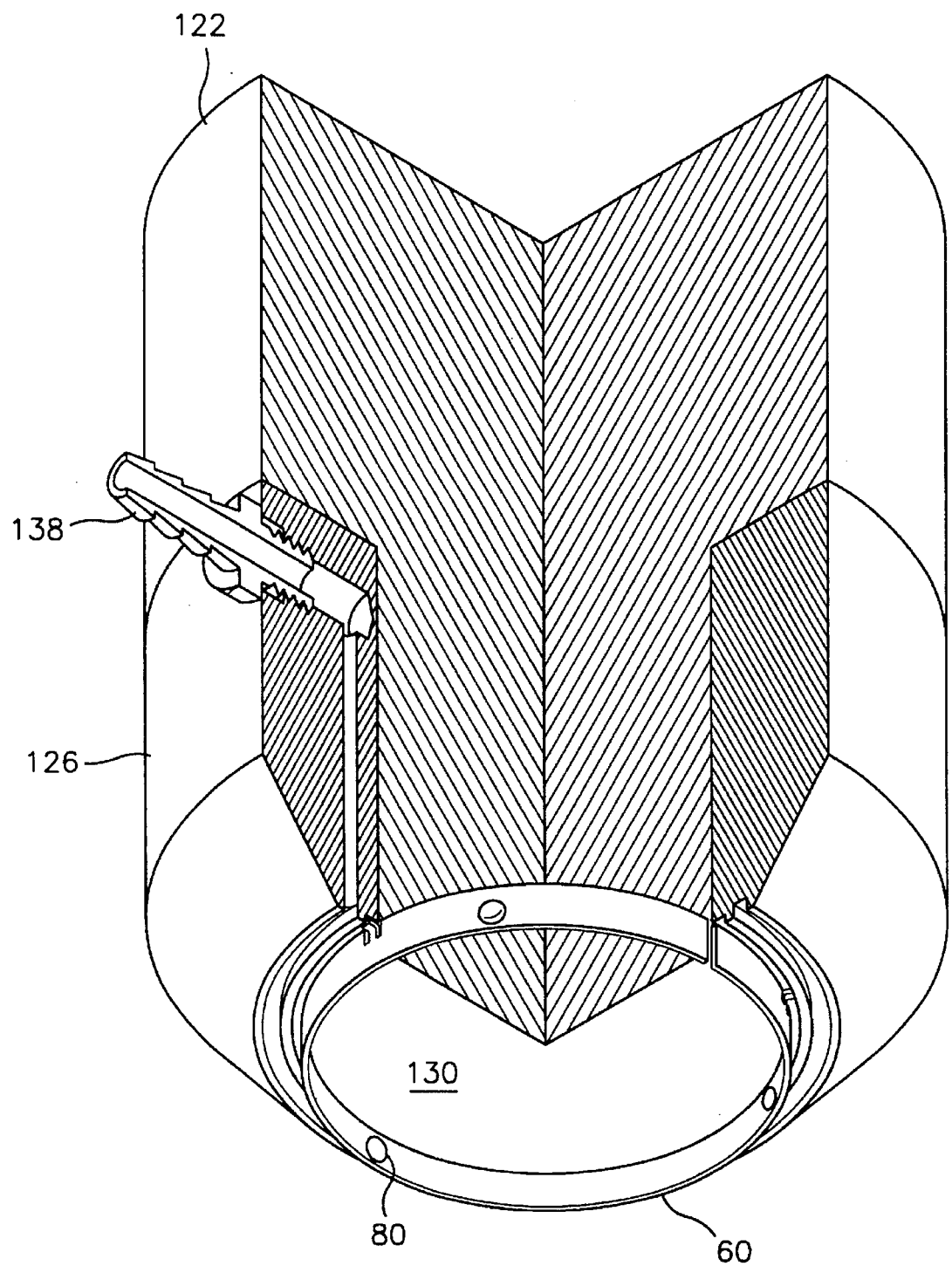
FIG. 18 is an isometric illustration of FIG. 17 in full except the tool has been partially broken away.

As shown in FIG. 17, a bottom 130 of the cylindrical portion 124 of the mandrel extends a slight distance below the bottom 128 of the chuck for receiving the transition region 74 of the split band (see FIG. 8). The loading region 76 of the split band 62 extends below the bottom 130 of the mandrel for assembly purposes which will be explained hereinafter. The bottom 128 of the chuck is provided with an annular recess or discrete recesses 131 which accommodate the tabs 82 of the split band 62. When the split band 60 has been located on the mandrel, it has been slightly expanded so that the split band 60 applies inward pressure on the mandrel and is retained thereby. The split band 60 may be manually inserted on the mandrel or may be first inserted on a cylinder with other retainers and automatically placed on the mandrel as desired. The bottom surface 128 of the chuck 126 is provided with an annular recess 132 which is in communication with a vertically extending passageway 134 which in turn communicates with a horizontal passageway 136, the passageway 136 receiving a fitting 138. The fitting 138 may be connected to an air vacuuming machine (not shown) for causing a vacuum in the annular recess 132 which will be employed for retaining the disk to the bottom surface 128 of the chuck, as will be described in more detail hereinafter. An isometric illustration of FIG. 17 is shown in FIG. 18.

Figure 19:
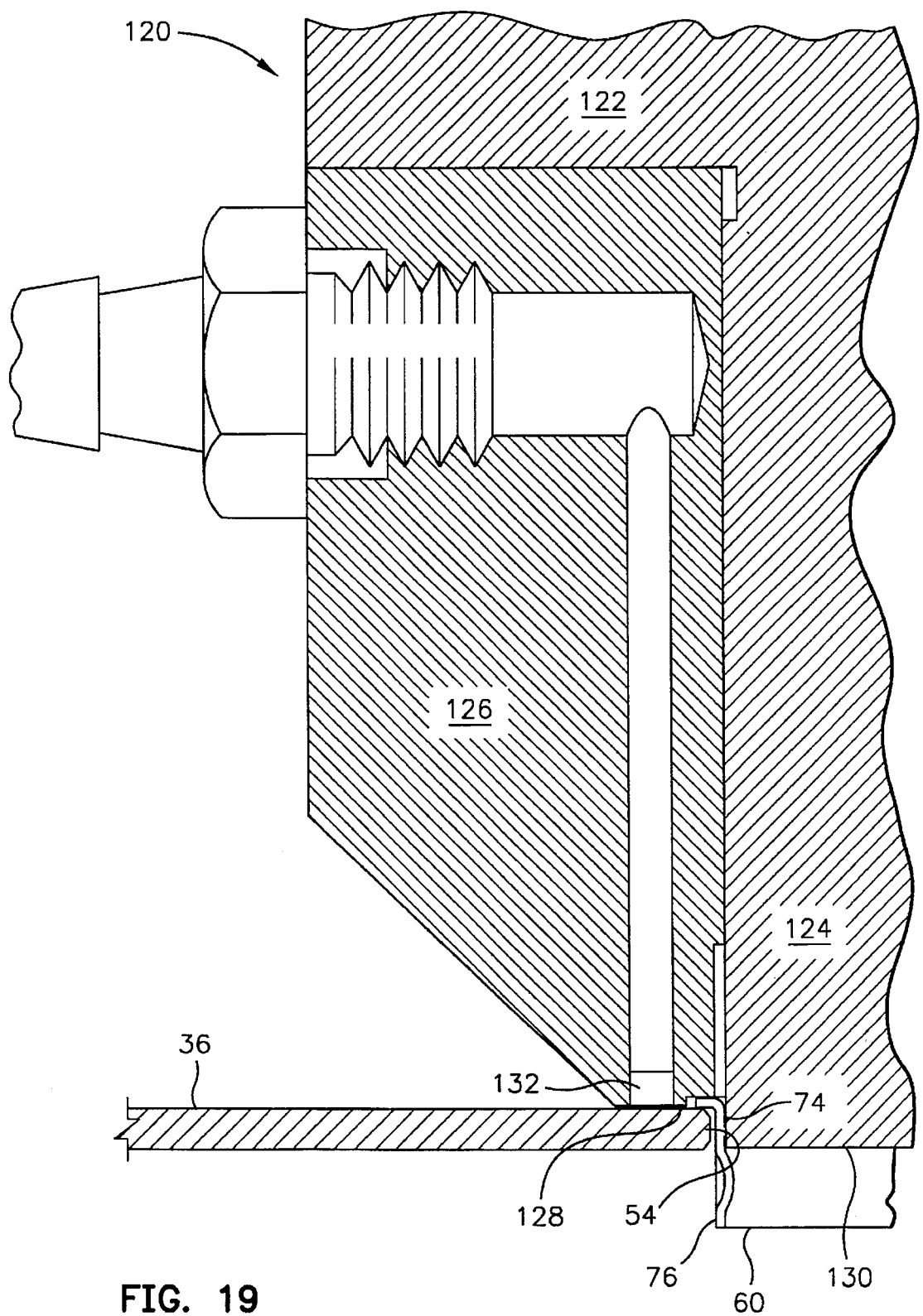
FIG. 19 is the same as FIG. 17 except the disk is now mounted on the tool in addition to the retainer.
Figure 20:
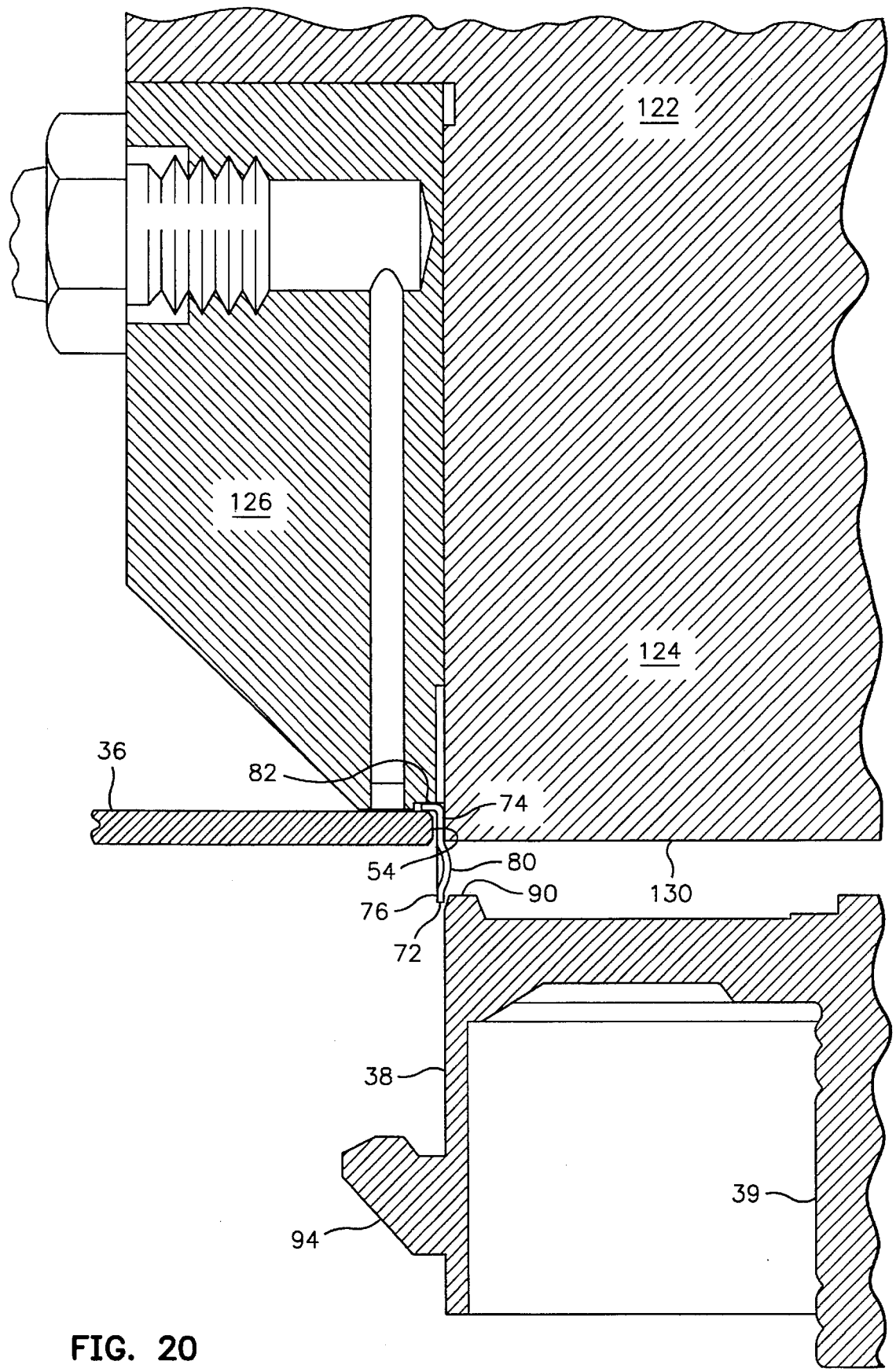
FIG. 20 is the same as FIG. 19 except the tool has located the bottom edge of the retainer adjacent a top edge of the spindle hub.

For convenience of illustration, the domes 80 and the tab 82 have been offset and located in the same annular position in FIGS. 19–26. FIG. 19 illustrates the split band 60 and the disk being retained to the tool 120. During this assembly step, the top surface of the disk 36 is being held by a vacuum against the bottom 128 of the chuck with the inner annular edge 54 of the disk located adjacent the transition region 74 (see FIG. 8) of the split band 60. The loading region 76 (see FIG. 8) of the split band 60 extends below the bottom surface of the disk 36 and below the bottom 130 of the mandrel. The split band 60 snugly engages the cylindrical surface of the mandrel 122 because of its resiliency when expanded. The inner annular edge 54 of the disk may have a slight tolerance (spacing) with respect to the outer annular surface of the split band 60 as shown in FIGS. 19 and 20. With this arrangement the chuck can be moved downwardly with respect to the mandrel to pick up the disk by vacuuming and can then be moved upwardly with respect to the mandrel 122 to locate the disk in the transition region 74 of the split band 60 as shown in FIG. 19.

Figure 21:
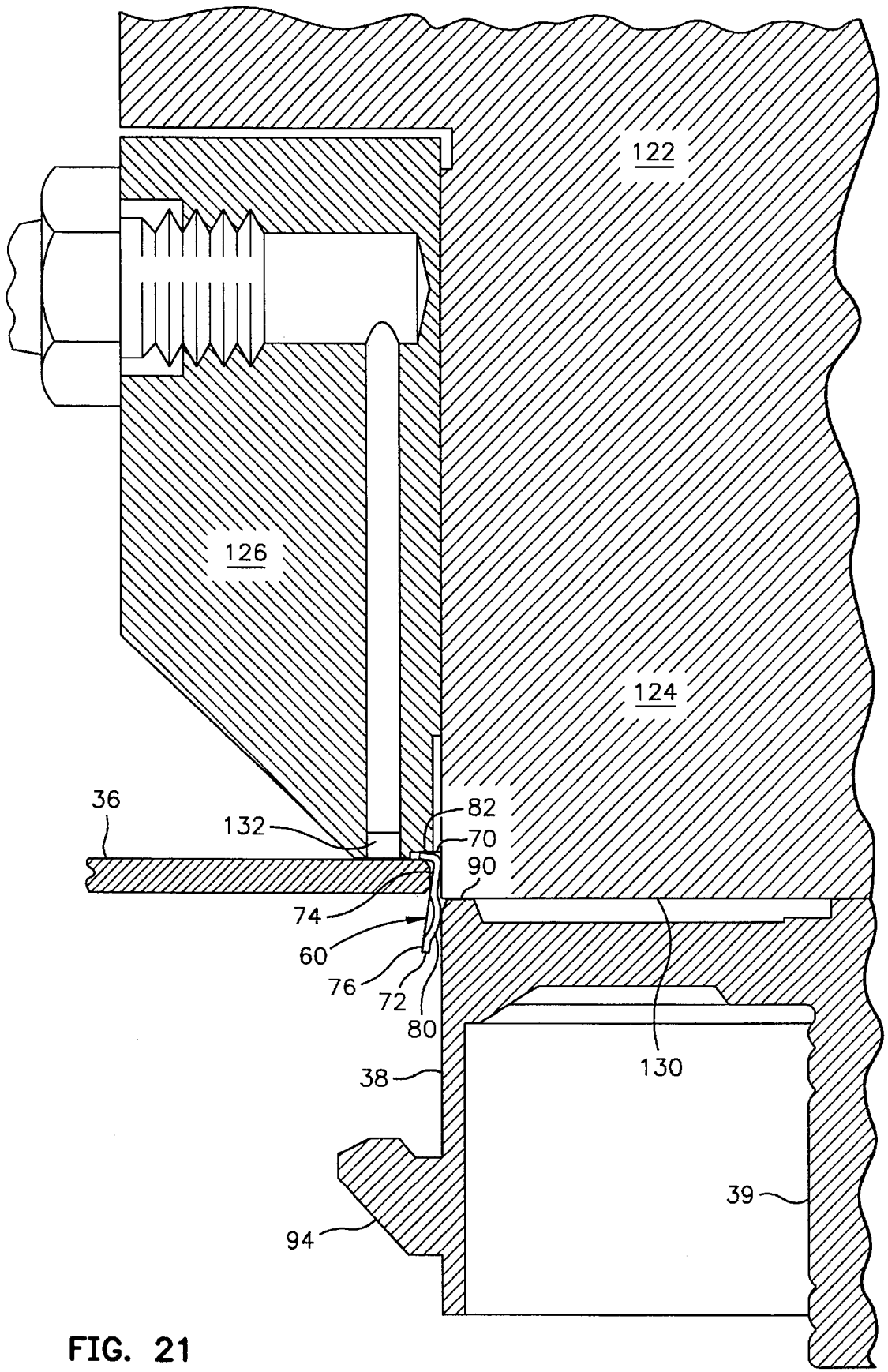
FIG. 21 is the same as FIG. 20 except the chuck has been moved down slightly to cause the loading domes of the retainer to cone the retainer.
Figure 22:
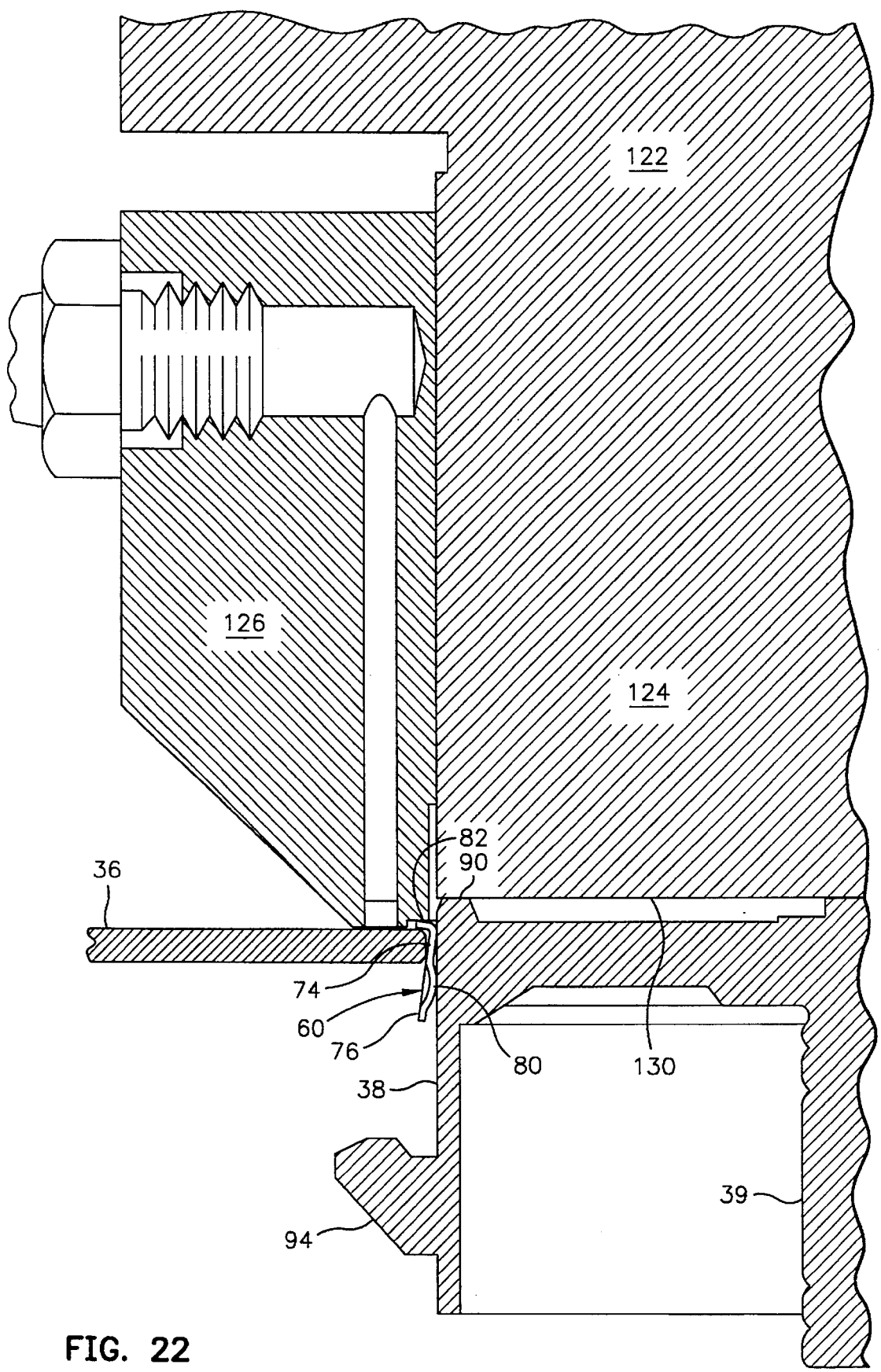
FIG. 22 is the same as FIG. 21 except the chuck has been moved down further against the tabs of the retainer to move the retainer and disk toward a hub flange.
Figure 23:
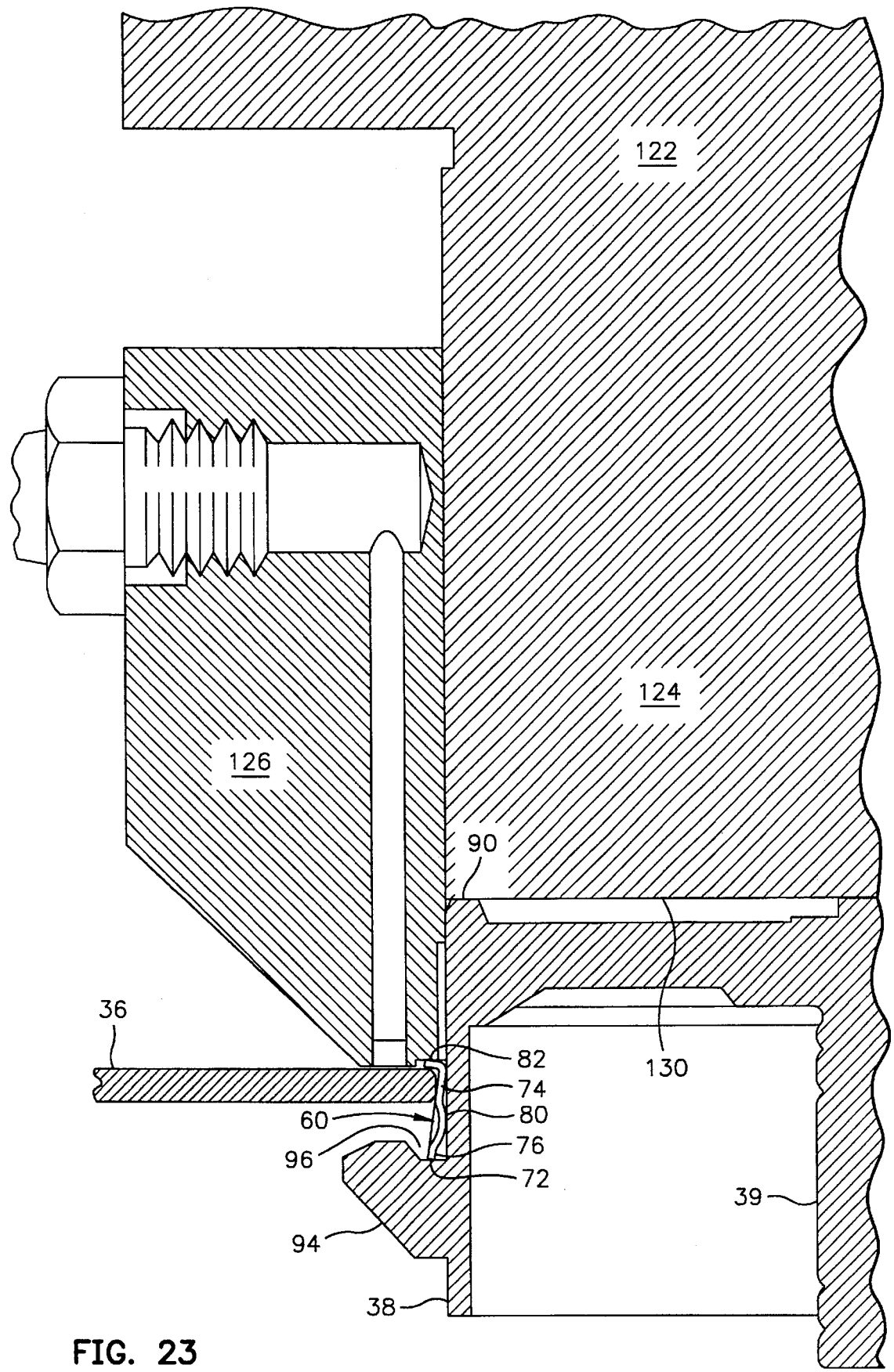
FIG. 23 is the same as FIG. 22 except the chuck has been moved downwardly still further to engage a bottom edge of the retainer in an annular recess of the hub flange.

In FIG. 20, the bottom 130 of the mandrel has been brought into close proximity with the top surface 90 of the spindle hub. In this position, the inner annular edge 54 of the disk is still located in the transition region 74 of the split band 60 with the top surface of the disk 36 engaging the bottom of the tabs 82. The bottom edge of the split band 60 is adjacent the chamfer of the spindle hub which ensures that the bottom edge 72 of the split band 60 will slip onto the cylindrical surface of the hub. In FIG. 21, the chuck 126 has been moved further downwardly causing the loading domes 80 to engage the chamfer 92 of the hub which results in the split band 60 being coned with the bottom edge 72 of the split band 60 being located outwardly with respect to its top edge 70. In FIG. 22, the bottom surface 130 of the cylindrical mandrel has engaged the top surface 90 of the spindle hub. In FIG. 22, the chuck 126 has been moved further downwardly with respect to the mandrel 122 causing the entire split band 60 and disk 36 to be mounted about the cylindrical surface of the spindle hub 38. In this position, the engagement of the loading dome 80 with the cylindrical surface of the hub 38 maintains the coning of the split band 60. In FIG. 23, the chuck 126 has been moved further downwardly with respect to the mandrel 122 causing the bottom edge 72 of the split band to engage the hub flange 94 within its recess 96. In this position, the disk is still located in the transition region 74 of the split band 60 with its top surface in direct engagement with the bottom of the tabs 82. The tool 120 now releases its vacuum arid is withdrawn (not shown) from the disk 36, the split band 60 and the spindle hub 38.

Figure 24:
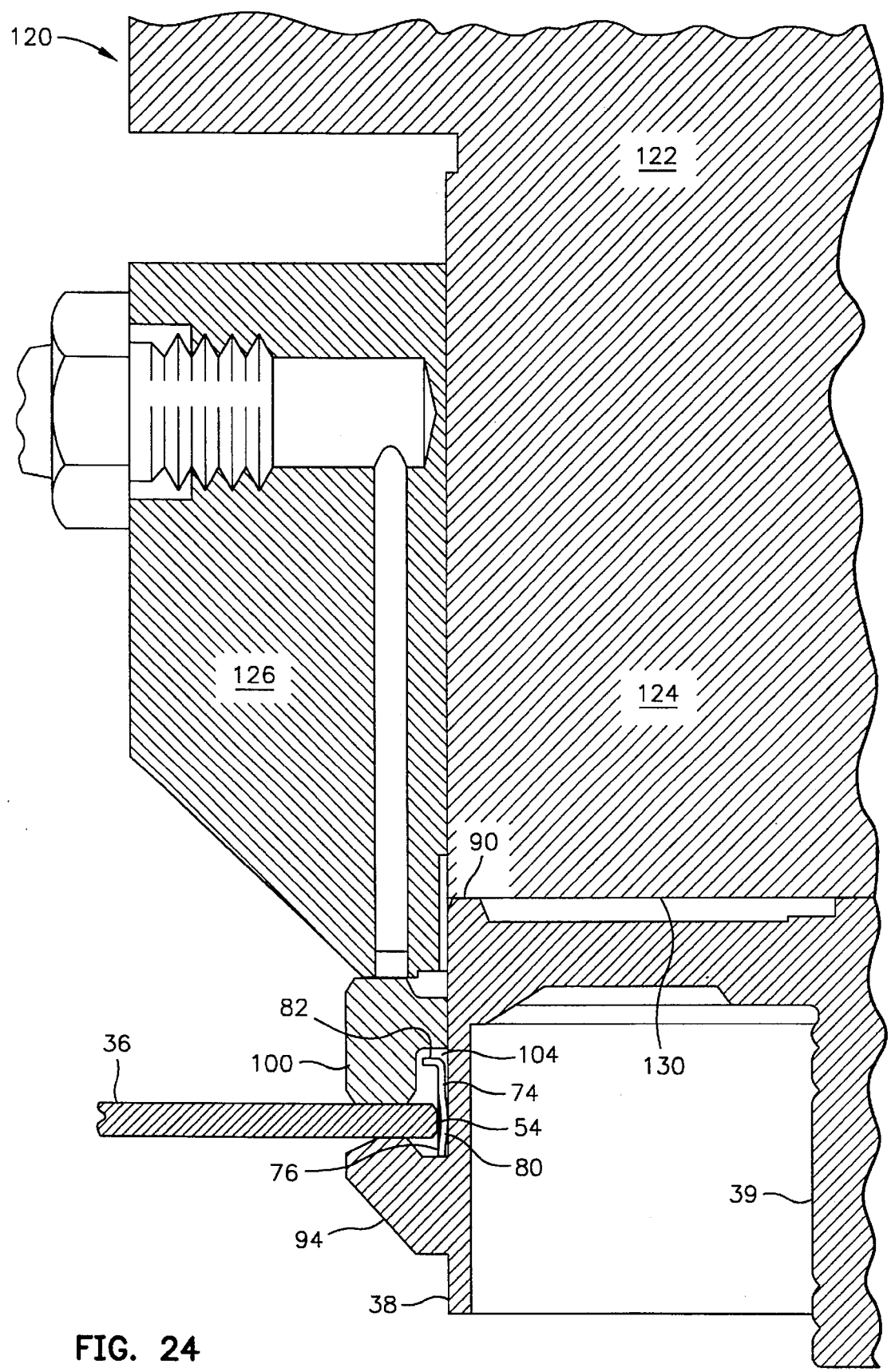
FIG. 24 is a cross-sectional elevational view illustrating a disk spacer being employed with the tool for pushing the disk from a transition region of the retainer to a loading region of the retainer and engaging the bottom disk surface with the hub flange.

In FIG. 24, the disk spacer 100 may be employed in conjunction with the tool 120 for moving the disk from the transition region 74 to the loading region 76 of the split band 60. This is accomplished by simply mounting the spacer 100 on the top surface of the disk 36 and pushing down on the spacer with the chuck 126 until the disk is moved from the transition region 74 to the loading region 76 of the split band 60 as shown in FIG. 24. In this position, the loading domes 80 are compressed against the outer cylindrical surface of the spindle hub 38 providing a radial clamping pressure between the inner annular edge 54 of the disk and the outer cylindrical surface of the hub 38. The loading domes 80 exert concentrated forces against the cylindrical surface of the hub 38 while the inner surface of the loading region 76 of the split band 60 exerts distributed pressure about the inner annular edge 54 of the disk. The bottom flat surface of the disk 36 is now in direct engagement with the top flat surface 90 of the hub flange and the tabs 82 are located within the annular recesses 104 of the spacer 100.

Figure 25:
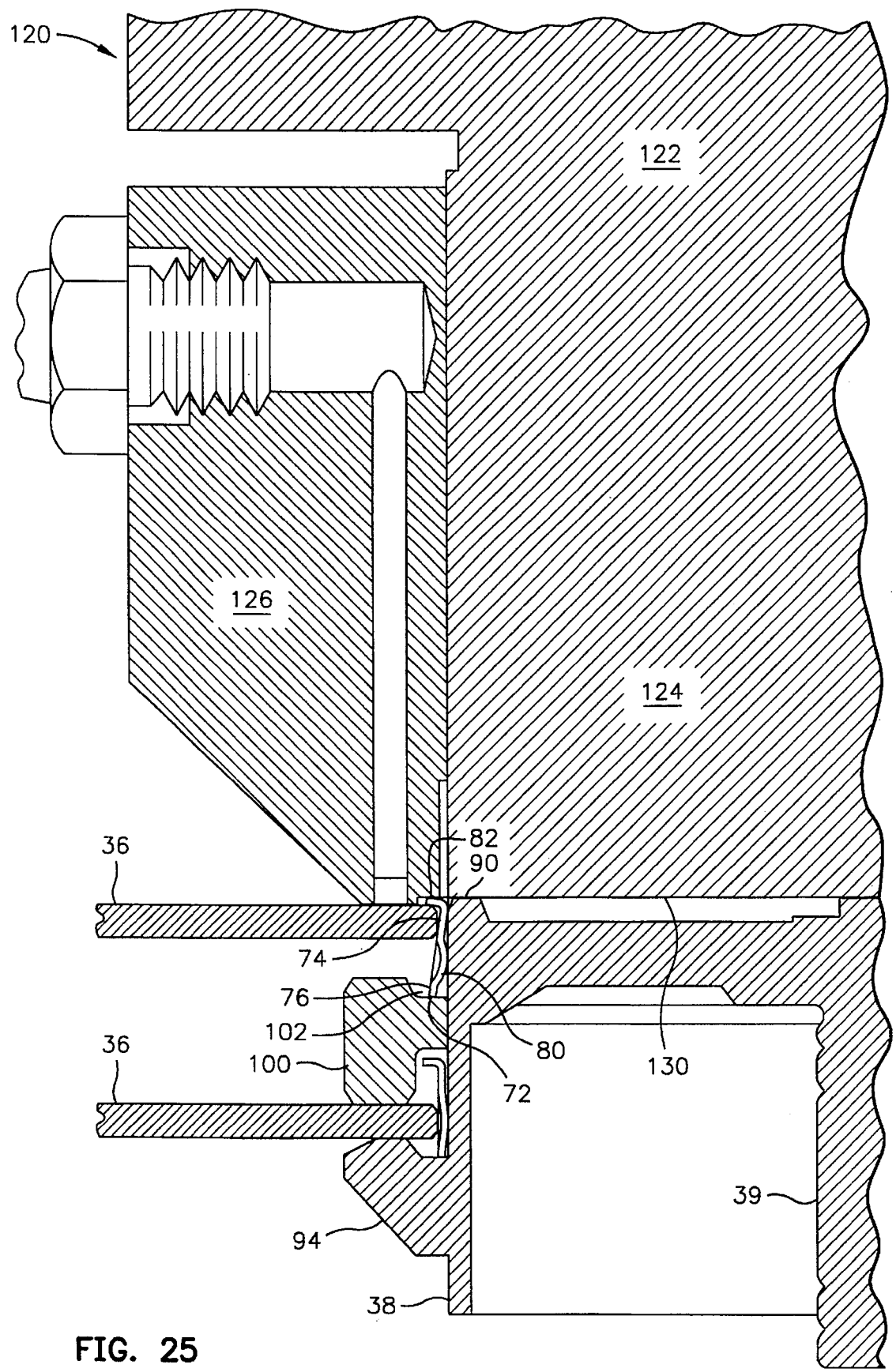
FIG. 25 is a cross-sectional elevational view of the tool inserting a second disk and second retainer on the spindle hub.
Figure 26:
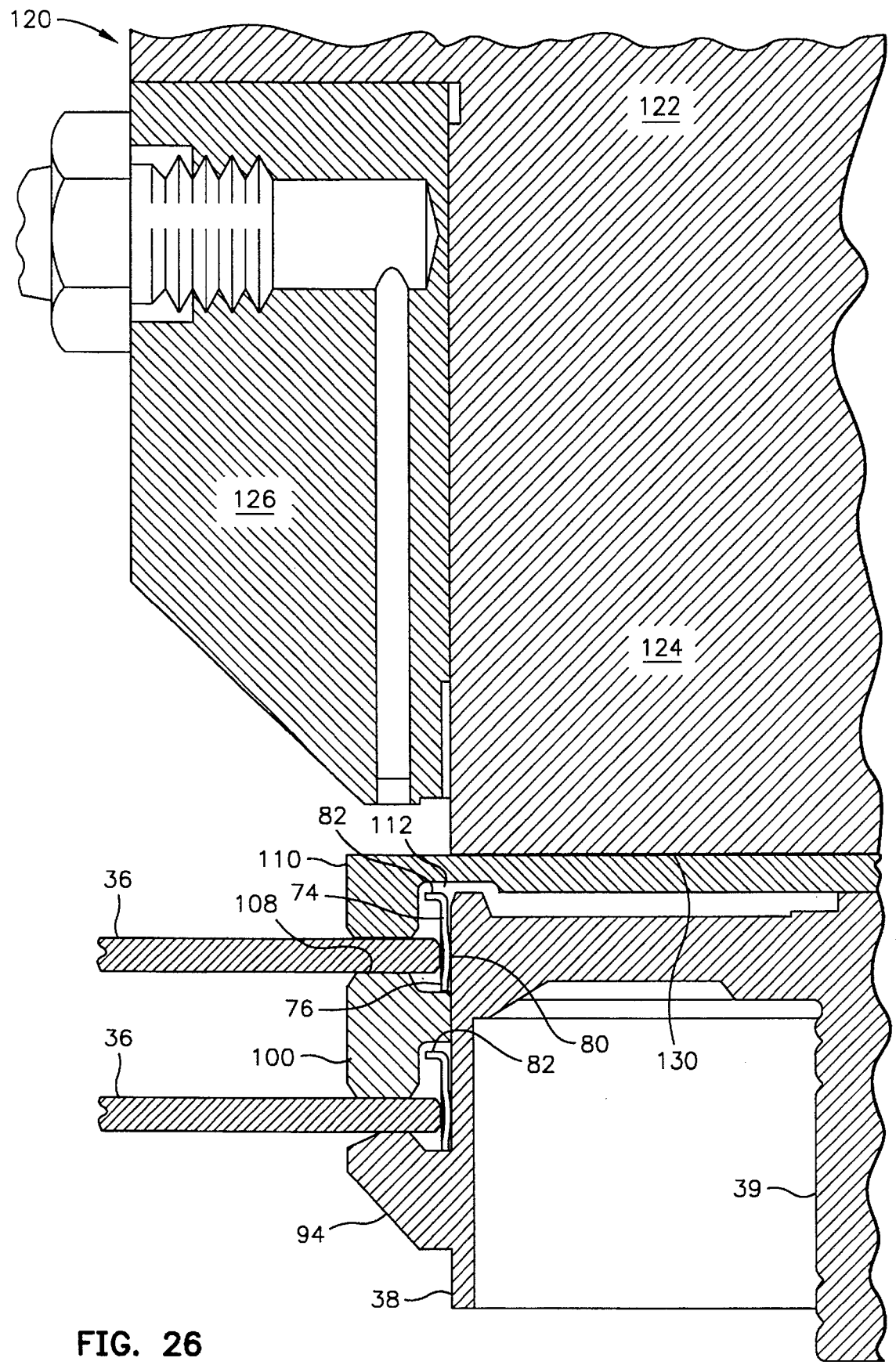
FIG. 26 is a cross-sectional elevational view of a cap being employed with the tool for moving the second disk from the transition region of the retainer to the loading region of the retainer with a bottom surface of the second disk engaging the disk spacer.

FIG. 25 shows the mounting of a second disk 36 on the spindle hub 38 using the aforementioned tool 120. The tool 120 is employed in the same manner as described hereinabove and has mounted the second disk 36 and second split band 60 on the cylindrical hub, the same as shown in FIG. 24, except the bottom edge 72 of the second split band 60 is recessed within the top recess 102 of the disk spacer 100. As shown in FIG. 26, the cap 110 may be then employed in conjunction with the tool 120 for forcing the second disk downwardly from the transition zone 74 to the loading zone 76 of the second split band 60 with the bottom of the second disk in direct engagement with the top flat surface 108 of the disk spacer. As discussed hereinabove, the cap 110 is provided with an annular recess 112 for accommodating the tabs 82 of the second split band. The cap 110 may then be secured to the hub by the bolt 114 which is threaded into the spindle 39 as shown in FIG. 12.

It should be understood that additional disks may be mounted between the hub flange 94 and the cap 110 by employing additional disk spacers 100 and mounting the additional disks in the same manner as described hereinabove. It should also be understood that the disks 36 may be loaded onto the spindle hub 38 manually instead of automatically with the tool 120. Whether the loading be done manually or automatically, the coning of the split band 60 as it first engages the cylindrical hub 38, as shown in FIG. 21, is a unique arrangement for efficient assembly and permits the final radial loading step to be accomplished by pushing the disk from the transition region 74 to the loading region 76 of the split band 60. Further, the tabs 82 provide retention of the disk while the chuck 126 pushes the split band 60 and the disk 36 downwardly on the cylindrical hub 38.

Obviously, other embodiments and modifications of the invention will occur to those of ordinary skill in the art in view of the above teachings. Therefore, the invention is to be limited only by the following claims which include all such embodiments and modifications when viewed in conjunction with the above specification and the accompanying drawing.

I claim:

1. A disk drive comprising:

a spindle hub, the hub having an outer cylindrical surface;

a disk having a pair of flat surfaces which are bounded by inner and outer annular edges;

a retainer for retaining the disk to the hub, the retainer including:

a resilient split band having inner and outer arcuate surfaces which are bounded by top and bottom arcuate edges, each of the surfaces being broken by a split in the band and having a transition region bounded in part by the top edge and an adjacent loading region bounded in part by the bottom edge;

the loading region of the inner arcuate surface of the split band having a plurality of annularly spaced inwardly extending biasing means;

said split band being expanded about the hub so that the biasing means exert an inward spring force on the outer cylindrical surface of the hub;

each of the transition region and the loading region being capable of accommodating the inner annular edge of the disk in an adjacent relationship;

the inner annular edge of the disk being located adjacent the loading region of the outer arcuate surface of the split band and exerting an inward force thereon to cause the biasing means to exert a force for retaining the disk to the hub; and the annular transition region of the split band having a plurality of tabs located about said top edge.

2. A disk drive as claimed in claim 1 wherein the biasing means are a plurality of loading domes.

3. A disk drive as claimed in claim 2 wherein each of the loading domes has a center which is substantially centered with respect to a thickness of the disk.

4. A disk drive as claimed in claim 3 wherein the number of loading domes is three.

5. A disk drive as claimed in claim 4 wherein the domes are compressed against the hub to load the disk on the hub.

6. A disk drive as claimed in claim 1 wherein the hub has an end which has an annular chamfer.

7. A disk drive as claimed in claim 1 including:

the hub having a hub flange which has an annular recess adjacent the hub; and the bottom edge of the band engaging the flange in said annular recess and one of the flat surfaces of the disk engaging the hub flange.

8. A disk drive as claimed in claim 7 including:

the biasing means are a plurality of loading domes; and each of the loading domes having a center which is substantially centered with respect to a thickness of the disk.

9. A disk drive as claimed in claim 8 including:

the number of loading domes being three; and each dome being a partial sphere which has been compressed to load the disk on the hub.

10. A disk drive as claimed in claim 9 wherein the hub has an end which has an annular chamfer.

11. A disk drive comprising:

a spindle hub, the hub having an outer cylindrical surface;

a disk having a pair of flat surfaces which are bounded by inner and outer annular edges, the inner annular edge defining an aperture;

a retainer for retaining the disk to the hub, the retainer including:

a resilient split band having inner and outer arcuate surfaces, each surface being broken by a split in the band;

said inner surface of the split band having a plurality of inwardly extending annularly spaced substantially circular shaped loading domes;

said split band being expanded about the outer cylindrical surface of the hub so that the loading domes exert an inward spring force thereon;

the inner annular edge of the disk engaging the outer surface of the split band and exerting an inward force on the band which causes the loading domes to exert a radial loading force which retains the disk to the hub.

12. A disk drive as claimed in claim 11 including:

the inner surface of the split band being bounded by a pair of edges;

the hub having a hub flange which has an annular recess adjacent the hub; and one of the edges of the band engaging the flange in said annular recess and one of the flat surfaces of the disk engaging the hub flange.

13. A disk drive as claimed in claim 11 wherein each of the loading domes has a center which is substantially centered with respect to a thickness of the disk.

14. A disk drive as claimed in claim 11 wherein the number of loading domes is only three.

15. A disk drive as claimed in claim 11 wherein each dome is a partial sphere which has been flattened by compression to load the disk on the hub.

16. A disk drive as claimed in claim 11 including:

each of the inner and outer arcuate surfaces of the split band having a transition region and a loading region;

the loading domes extending inwardly from only the loading region; and said inner annular edge of the disk directly engaging said loading region.

17. A disk drive as claimed in claim 16 including:

the inner and outer surfaces of the band being bounded by a pair of edges;

the hub having a hub flange which has an annular recess adjacent the hub; and one of the edges of the band engaging the flange in said annular recess and one of the flat surfaces of the disk engaging the hub flange.

18. A disk drive as claimed in claim 17 wherein each of the loading domes has a center which is substantially centered with respect to a thickness of the disk.

19. A disk drive as claimed in claim 18 wherein a second one of the edges of the split ring has a plurality of inwardly extending tabs, a bottom edge of each tab being engageable with a top flat surface of the disk and a top edge of each tab being engageable with a tool for moving the split ring and the disk onto the hub.

20. A disk drive as claimed in claim 19 wherein each dome is a partial sphere which has been flattened by compression to load the disk on the hub.

21. A disk drive comprising:

a disk located about a hub with an annular gap therebetween; and a split band located in said gap and having substantially circular shaped loading domes which engage the hub and load the disk on the hub.

22. A disk drive as claimed in claim 21 including:

the split band having inner and outer arcuate surfaces;

each of the inner and outer arcuate surfaces of the split band having a transition region and a loading region;

the loading domes extending inwardly from the loading region;

said inner annular edge of the disk being located adjacent said loading region; and each of the transition region and the loading region being capable of accommodating the inner annular edge of the disk in an adjacent relationship, the split band coning when the transition region accommodates the inner annular edge of the disk during insertion of the split band and disk on said hub.

23. A disk drive as claimed in claim 22 including:

the inner and outer arcuate surfaces of the split band being bounded by a pair of edges;

the hub having a hub flange which has an annular recess adjacent the hub; and one of the edges of the band engaging the flange in said annular recess and one of the flat surfaces of the disk engaging the hub flange.

24. A disk drive as claimed in claim 23 including:

a second one of the edges of the split band having a plurality of inwardly extending tabs, a bottom edge of each tab being engageable with a top flat surface of the disk and a top edge of each tab being engageable with a tool for moving the split ring and the disk onto the hub;

each of the loading domes having a center which is substantially centered with respect to a thickness of the disk; and each dome being a partial sphere which has been flattened by compression to load the disk on the hub.

25. A disk drive as claimed in claim 24 wherein the hub has an end which has an annular chamfer.

26. A disk drive comprising:

a hub;

a plurality of disks located about the hub and spaced therealong by at least one spacer ring;

a plurality of split bands, each split band being located between a respective disk and the hub;

each split band having a plurality of substantially circular shaped loading domes which engage the hub and load the disk on the hub.

27. A disk drive as claimed in claim 26 including:

each split band having inner and outer arcuate surfaces;

each of the inner and outer arcuate surfaces of each split band having a transition region and a loading region;

the loading domes extending inwardly from the loading regions;

the inner annular edge of each disk being located adjacent a respective loading region; and each of the transition regions and the loading regions being capable of accommodating the inner annular edge of one of the disks in an adjacent relationship, the split band coning when the transition region accommodates the inner annular edge of the disk during insertion of the split band and disk on said hub.

28. A disk drive as claimed in claim 27 including:

the inner and outer arcuate surfaces of each split band being bounded by a pair of edges;

the hub having a hub flange which has an annular recess adjacent the hub; and one of the edges of one of the bands engaging the flange in said annular recess and one of the flat surfaces of one of the disks engaging the hub flange.

29. A disk drive as claimed in claim 28 including:

a second one of the edges of each of the split band having a plurality of inwardly extending tabs, a bottom edge of each tab being engageable with a top flat surface of the disk and a top edge of each tab being engageable with a tool for moving the split ring and the disk onto the hub;

each of the loading domes having a center which is substantially centered with respect to a thickness one of the disks; and each dome being a partial sphere which has been flattened by compression to load the disks on the hub.

30. A disk drive as claimed in claim 29 wherein the hub has an end which has an annular chamfer.

31. A retainer for loading a disk on a spindle hub, the disk having an inner annular edge which circumscribes the spindle hub, the retainer comprising:

a resilient split band having inner and outer substantially arcuate surfaces which are bounded by top and bottom substantially arcuate edges, each of the surfaces being broken by a split in the split band and having a transition region bounded in part by the top edge and an adjacent loading region bounded in part by the bottom edge;

each of the transition region and the loading region being capable of accommodating the inner annular edge of the disk in an adjacent relationship, the split band coning when the transition region accommodates the inner annular edge of the disk during insertion of the split band and disk on said hub;

the loading region of the inner surface of the split band having a plurality of substantially annularly spaced inwardly extending biasing means;

said split band being expandable about the hub so that the biasing means are capable of exerting an outward spring force on the inner annular edge of the disk;

the loading region of the outer surface of the split band being capable of being received within the inner annular edge of the disk so that the disk exerts an inward force on the split band causing the biasing means to exert radial compressive loading which retains the disk to the hub; and the annular transition region of the split band having a plurality of tabs located about said top edge, a bottom edge of each tab being engageable with a top flat surface of the disk and a top edge of each tab being engageable with a tool for moving the split ring and the disk onto the hub.

32. A retainer as claimed in claim 31 including:

the biasing means being a plurality of substantially circular loading domes; and each of the loading domes having a center which is substantially centered with respect to a thickness of the disk.

33. A retainer as claimed in claim 32 including:

the top edge of the split band having a plurality of inwardly extending tabs, a bottom edge of each tab being engageable with a top flat surface of the disk and a top edge of each tab being engageable with a tool for moving the split ring and the disk onto the hub; and each dome being a partial sphere which has been flattened by compression to load the disk on the hub.

34. A method of assembling at least one disk on a hub wherein the hub has an annular hub flange, the hub flange has an annular recess adjacent the hub and the disk has a central aperture, the method comprising the steps of:

expanding a split band to fit about the hub, the split band having a height which is bounded by top and bottom arcuate edges, the height having a top located arcuate transition region and a bottom located arcuate loading region, the arcuate transition region having tabs which extend inwardly from said top arcuate edge and the arcuate loading region having outwardly extending biasing means for retaining the disk on the hub;

inserting the split band within the central aperture of the disk with the disk located adjacent said arcuate transition region of the split band and engaging said tabs;

pushing downwardly on the tabs causing the biasing means to engage the hub and cone the split band with the bottom arcuate edge located inwardly with respect to the top arcuate edge;

continuing to push downwardly on the tabs with the split band coned until the bottom arcuate edge of the split band engages the hub flange within said recess; and pushing downwardly on a surface of the disk to move the disk from said arcuate transition region to said arcuate loading region until the split band decones and the biasing means exerts radial compressive force to retain the disk on the hub.

35. A method as claimed in claim 34 wherein:

the step of expanding the split band to fit about the hub includes fitting the split band about an annular mandrel which has substantially the same diameter as the hub; and the steps of pushing downwardly on the tabs include engaging a bottom surface of a chuck with the tabs and slidably moving the chuck downwardly with respect to the mandrel.

36. A method as claimed in claim 35 including the step of applying a vacuum between a surface of the disk and the bottom surface of the chuck until the disk is pushed downwardly.

37. A method as claimed in claim 36 wherein the hub has a top, the top having a circular chamfer and the hub flange being located downwardly from the top so as to provide an annular space therebetween.

38. A method as claimed in claim 37 wherein the biasing means are a plurality of loading domes.

39. A method as claimed in claim 38 wherein the number of loading domes is three.

40. A method as claimed in claim 39 wherein the bottom surface of the chuck has a recess for receiving each tab.

41. A method of assembling first and second disks on a hub wherein the hub has an annular hub flange, the hub flange has an annular recess adjacent the hub and each disk has a central aperture, the method comprising the steps of:

providing first and second resilient split bands, each split band having a height which is bounded by top and bottom arcuate edges, the height of each split band having a top located arcuate transition region and a bottom located arcuate loading region, the arcuate transition region having tabs which extend inwardly from said top arcuate edge and the arcuate loading region having outwardly extending biasing means for biasing one of the disks against the hub;

expanding the first split band to fit about the hub;

inserting the first split band within the central aperture of the first disk with the first disk located adjacent said arcuate transition region of the first split band and engaging said tabs;

pushing downwardly on the tabs of the first split band causing the biasing means to engage the hub and cone the first split band with the bottom arcuate edge located inwardly with respect to the top arcuate edge;

continuing to push downwardly on the tabs of the first split band with the first split band coned until the bottom arcuate edge of the first split band engages the hub flange within said recess;

providing an annular spacer for circumscribing the hub, the annular spacer having top and bottom annular recesses adjacent the hub, the bottom recess being capable of receiving the tabs of the first split band;

employing the annular spacer to push downwardly on a surface of the first disk to move the first disk from said arcuate transition region to said arcuate loading region until the first split band decones and the biasing means exerts a radial compressive force to retain the first disk on the hub;

expanding the second split band to fit about the hub;

inserting the second split band within the central aperture of the second disk with the second disk located adjacent the arcuate transition region and engaging the tabs of the second split band;

pushing downwardly on the tabs of the second split band causing the biasing means to engage the hub and cone the second split band with the bottom arcuate edge located inwardly with respect to the top arcuate edge;

continuing to push downwardly on the tabs of the second split band with the second split band coned until the bottom arcuate edge of the second split band engages the annular spacer within said top recess;

providing an annular cap which has a top and a bottom, the bottom having a recess for receiving the tabs of the second split band; and employing the cap to push downwardly on a surface of the second disk to move the second disk from said arcuate transition region to said arcuate loading region until the second split band decones and the biasing means exerts a radial compressive force to retain the second disk on the hub.

42. A method as claimed in claim 41 wherein:

the steps of expanding the split bands to fit about the hub includes fitting the split bands about an annular mandrel which has substantially the same diameter as the hub; and the steps of pushing downwardly on the tabs include engaging a bottom surface of a chuck with the tabs and slidably moving the chuck downwardly with respect to the mandrel.

43. A method as claimed in claim 42 including the step of applying a vacuum between a surface of each disk and the bottom surface of the chuck until the disk is pushed downwardly.

44. A method as claimed in claim 43 wherein the hub has a top, the top having a circular chamfer and the hub flange being located downwardly from the top so as to provide an annular space therebetween.

45. A method as claimed in claim 44 wherein the biasing means are a plurality of loading domes.

46. A method as claimed in claim 45 wherein each split band has three loading domes.

47. A method as claimed in claim 46 wherein the bottom surface of the chuck has a recess for receiving each tab.

* * * * *